United States Patent
Thomas et al.

(10) Patent No.: US 10,530,802 B2
(45) Date of Patent: Jan. 7, 2020

(54) METHOD AND SYSTEM FOR AUTOMATIC DETECTION AND ANALYSIS OF MALWARE

(71) Applicant: Verisign, Inc., Reston, VA (US)

(72) Inventors: Ralph Thomas, Fredericksburg, VA (US); Bruce Michael Ligh, Houston, TX (US)

(73) Assignee: VERISIGN, INC., Reston, VA (US)

( * ) Notice: Subject to any disclaimer, the term of this patent is extended or adjusted under 35 U.S.C. 154(b) by 0 days.

(21) Appl. No.: 15/003,273

(22) Filed: Jan. 21, 2016

(65) Prior Publication Data

US 2016/0156658 A1 Jun. 2, 2016

Related U.S. Application Data

(63) Continuation of application No. 13/219,208, filed on Aug. 26, 2011, now Pat. No. 9,245,114.

(Continued)

(51) Int. Cl.
*G06F 21/56* (2013.01)
*H04L 29/06* (2006.01)
(Continued)

(52) U.S. Cl.
CPC .......... *H04L 63/1433* (2013.01); *G06F 3/067* (2013.01); *G06F 3/0623* (2013.01); *G06F 3/0643* (2013.01); *G06F 3/0679* (2013.01); *G06F 9/4405* (2013.01); *G06F 21/55* (2013.01); *G06F 21/56* (2013.01); *G06F 21/565* (2013.01); *G06F 21/566* (2013.01); *H04L 63/1425* (2013.01); *G06F 2221/2101* (2013.01); *G06F 2221/2115* (2013.01);
(Continued)

(58) Field of Classification Search
CPC ...................................................... G06F 21/56
See application file for complete search history.

(56) References Cited

U.S. PATENT DOCUMENTS 6,981,279 B1 * 12/2005 Arnold .................. G06F 21/566 703/27
7,103,913 B2 * 9/2006 Arnold .................. G06F 21/566 713/188

(Continued)

FOREIGN PATENT DOCUMENTS

WO 98/24023 6/1998
WO 99/15966 4/1999

OTHER PUBLICATIONS

Sunu Thomas, Sherly K.K and Dija S; "Extraction of Memory Forensic artifacts from Windows 7 RAM Image"; Proceedings of 2013 IEEE Conference on Information and Communication Technologies (ICT 2013) pp. 937-942.*

(Continued)

*Primary Examiner* — Jason Chiang
(74) *Attorney, Agent, or Firm* — Artegis Law Group, LLP

(57) ABSTRACT

A method of detecting malicious software (malware) includes receiving a file and storing a memory baseline for a system. The method also includes copying the file to the system, executing the file on the system, terminating operation of the system, and storing a post-execution memory map. The method further includes analyzing the memory baseline and the post-execution memory map and determining that the file includes malware.

19 Claims, 16 Drawing Sheets

Related U.S. Application Data

(60) Provisional application No. 61/377,427, filed on Aug. 26, 2010.

(51) Int. Cl.
*G06F 21/55* (2013.01)
*G06F 3/06* (2006.01)
*G06F 9/4401* (2018.01)

(52) U.S. Cl.
CPC .. *G06F 2221/2119* (2013.01); *H04L 63/1416* (2013.01); *H04L 63/1441* (2013.01)

(56) References Cited

U.S. PATENT DOCUMENTS

| | | | | |
|---|---|---|---|---|
| 7,210,040 B2* | 4/2007 | Jordan | ............ | G06F 21/566 713/187 |
| 7,287,279 B2* | 10/2007 | Bertman | ............ | G06F 21/563 382/103 |
| 7,409,719 B2* | 8/2008 | Armstrong | ............ | G06F 21/53 713/1 |
| 7,472,420 B1 | 12/2008 | Pavlyushchik | | |
| 7,603,713 B1* | 10/2009 | Belov | ............ | G06F 11/3652 703/13 |
| 7,631,357 B1* | 12/2009 | Stringham | ............ | G06F 21/56 726/24 |
| 7,657,935 B2* | 2/2010 | Stolfo | ............ | H04L 12/585 709/206 |
| 7,669,059 B2* | 2/2010 | Brent | ............ | G06F 21/56 713/152 |
| 7,716,736 B2* | 5/2010 | Radatti | ............ | G06F 21/566 713/187 |
| 7,797,743 B2* | 9/2010 | Treacy | ............ | G06F 21/53 713/187 |
| 7,882,561 B2* | 2/2011 | Costea | ............ | G06F 21/564 713/188 |
| 7,895,651 B2* | 2/2011 | Brennan | ............ | G06F 21/55 705/51 |
| 7,913,306 B2* | 3/2011 | Apap | ............ | G06F 21/552 726/22 |
| 7,921,461 B1* | 4/2011 | Golchikov | ............ | G06F 21/575 713/2 |
| 7,984,513 B1* | 7/2011 | Kyne | ............ | G06F 21/10 706/47 |
| 8,069,484 B2* | 11/2011 | McMillan | ............ | G06F 21/563 713/194 |
| 8,181,244 B2* | 5/2012 | Boney | ............ | G06F 21/56 709/224 |
| 8,225,394 B2* | 7/2012 | Gassoway | ............ | G06F 21/51 713/188 |
| 8,272,058 B2* | 9/2012 | Brennan | ............ | G06F 21/55 713/187 |
| 8,370,941 B1* | 2/2013 | Pham | ............ | G06F 21/56 709/201 |
| 2004/0210769 A1 | 10/2004 | Radatti et al. | | |
| 2005/0193173 A1* | 9/2005 | Ring | ............ | G06F 21/57 711/118 |
| 2005/0216749 A1 | 9/2005 | Brent | | |
| 2005/0273856 A1* | 12/2005 | Huddleston | ............ | G06F 21/53 726/22 |
| 2006/0031673 A1* | 2/2006 | Beck | ............ | G06F 21/565 713/164 |
| 2006/0156380 A1* | 7/2006 | Gladstone | ............ | G06F 21/52 726/1 |
| 2007/0226796 A1* | 9/2007 | Gilbert | ............ | G06F 21/55 726/22 |
| 2008/0016571 A1* | 1/2008 | Chang | ............ | G06F 21/554 726/24 |
| 2008/0229419 A1* | 9/2008 | Holostov | ............ | G06F 21/564 726/24 |
| 2008/0256230 A1 | 10/2008 | Handley | | |
| 2008/0263658 A1* | 10/2008 | Michael | ............ | G06F 21/562 726/22 |
| 2011/0047621 A1* | 2/2011 | Brando | ............ | G06F 8/61 726/24 |
| 2011/0191850 A1* | 8/2011 | Turbin | ............ | G06F 11/00 726/24 |

OTHER PUBLICATIONS

Hao et al. A Methodology to Detect Kernel Level Rootkits based on Detecting Hidden Processes, 2008 International Conference on Apperceiving Computing and Intelligence Analysis, pp. 359-361.*
Donny Kettenis (Authorized Officer), International Search Report and Written Opinion dated Nov. 17, 2011, PCT Application No. PCT/US2011/049349, filed Aug. 26, 2011, pp. 1-14.

* cited by examiner

| Dashboard | Preferences | VirusTotal | Memory | File System | Registry |
|---|---|---|---|---|---|
| | | | | | |

| File | 0bd35e0a0b80da9a266b7f74b0dead4c (copy) |
|---|---|
| | Download the Report File Archive (click twice) |
| | Download the Automatic Cleaner Script |
| | Download the Registry Hives (.zip) |
| | View the Pymon API Monitor |
| | Download the Packet Capture (.pcap) |
| | View the Chaosreader Report |

| Behavior |
|---|
| Hides with NTFS ADS |
| Modifies MBR |
| Promiscious NIC |
| Installs BHO |
| Hooks APIs |
| Creates Services |
| Injects Code |
| Loads Kernel Driver |

Mark Report As  ○ Reviewed  ○ Bookmarked

Add to group/incident

FIG. 6

| Dashboard | Preferences | VirusTotal | Memory |

| Vendor | Detect |
|---|---|
| McAffee+Artemis | W32/RAHack |
| CAT-QuickHeal | I-Worm.Allaple.gen |
| McAfee | W32/RAHack |
| K7AntiVirus | Net-Worm.Win32.Allaple.a |
| TheHacker | W32/RAHack.gen |
| VirusBuster | Worm.Allaple.Gen |
| NOD32 | Win32/Allaple |
| F-Prot | W32/Allaple.C |
| a-squared | Net-Worm.Win32.Allaple.a!IK |
| Norman | Allaple.gen |
| Avast | Win32.Allaple |

FIG. 7

Search for

| StartServiceA | ImportAPI ▾ | Is ▾ | Go |

Statistics

| Total Submissions | 1072 |
|---|---|
| Submissions (Completed) | 1072 (100%) |
| Submissions (Waiting) | 0 (0%) |
| Submissions (Not Reviewed) | 1063 (99.2%) |

Grouped malware incidents

| Group | Count |
|---|---|
| BADHACK | 3 |
| TESTGROUP | 1 |

Most recent bookmarked reports

| Report | Comment/Reason |
|---|---|
| 030bfa00fa242669ff132f24b29b776abab18b0c | |
| 59f99286ea9dc56407135befd090893d1a6161a4 | Check TCPIP SYS patch |
| 6b10e600fb8342275322661962d5eb2d1a29ed51 | Loud Allaple |
| 7fb8ef2f79ede6b7dbec09b0680ea0de7564e597 | Very Loud, Check Out! |

FIG. 8

| | |
|---|---|
| Home Reports | |
| [Submit] | |
| Choose a file to upload | na/laqma/sophialite.ex_  [Browse...] |
| Sleep time | 20 |
| Reboot before analysis | ☐ |
| Post-execution program | c:\windows\notepad.exe |
| Notify Email | myself@notify.com |
| Guest OS | XPSP2 ▽ |
| Run as administrator | ☑ |
| Monitor API | ☑ |
| Capture screen | ☑ |
| Comment | testing figger |

FIG. 9

```
Enter your submissions:
Malware file      [                    ]  [ Browse... ]
Malware URL       [                    ]
Arguments         [                    ]
Email address     [                    ]
Post execution    [                    ]  - OR -  [ Select       ⇅ ]
File type         [ Auto            ⇅ ]
Guest OS          [ XPSP2           ⇅ ]
Runtime           [ 60                 ]
Reboot            ☐
Administrator     ☑
Save memory       ☐
Virustotal        ☐
Debug Plug-in     [ None            ⇅ ]
File system       ⦿ quick  ◯ deep
Comment           [                    ]
Priority          [ High            ⇅ ]
                  [ Submit Query ]
```

FIG. 12A

```
Enter your submissions:
Malware file      [ /Users/mhl/Desktop/Malw ]  [ Browse... ]
Malware URL       [                    ]
Arguments         [ --port=80          ]
Email address     [                    ]
Post execution    [                    ]  - OR -  [ Select       ⇅ ]
File type         [ Auto            ⇅ ]
Guest OS          [ XPSP2           ⇅ ]
Runtime           [ 600                ]
Reboot            ☐
Administrator     ☑
Save memory       ☐
Virustotal        ☐
Debug Plug-in     [ None            ⇅ ]
File system       ⦿ quick  ◯ deep
Comment           [                    ]
Priority          [ High            ⇅ ]
                  [ Submit Query ]
```

METHOD AND SYSTEM FOR AUTOMATIC DETECTION AND ANALYSIS OF MALWARE

This application is a continuation application of U.S. patent application Ser. No. 13/219,208 filed Aug. 26, 2011, which claims the benefit of U.S. Provisional Application No. 61/377,427 filed Aug. 26, 2010, the disclosure of which is incorporated herein by reference.

FIELD

The present disclosure relates generally to automatic detection and analysis of malware targeted to run on a computer system without informed consent.

BACKGROUND

Malware, short for malicious software, is software designed to infiltrate a computer system without the owner's informed consent. The expression is a general term used by computer professionals to mean a variety of forms of hostile, intrusive, or annoying software or program code. The term "computer virus" is sometimes used as a catch-all phrase to include all types of malware, including true viruses. Malware presents security issues for computer systems. Therefore, there is a need in the art for methods and systems for detecting and analyzing malware.

SUMMARY

The present disclosure relates generally to computer networks. More specifically, the present disclosure relates to methods and systems for detecting and analyzing malware. The methods and techniques may be applied to a variety of computer networks and communications systems.

A method is provided to receive a file for analysis, store a memory baseline for a system, and copy the file to the system. The file is executed on the system, the operation of the system is terminated, and a post-execution memory map of the system is stored. The memory baseline and the post-execution memory map are analyzed. As a result of the analysis, the method may determine that the file is infected with malware.

Additional objects of the disclosure will be set forth in part in the description which follows, and in part will be obvious from the description, or may be learned by practice of embodiments consistent with the disclosure. It is to be understood that both the foregoing general description and the following detailed description are exemplary and explanatory only and are not restrictive of the application, as claimed.

The accompanying drawings, which are incorporated in and constitute a part of this specification, illustrate embodiments of the application and together with the description, serve to explain the principles of the application subject matter.

BRIEF DESCRIPTION OF THE DRAWINGS

FIG. 6 is an exemplary display screen of a report dashboard;

FIG. 7 is an exemplary display screen illustrating different anti-virus vendors' assigned names for a particular malware implementation FIG. 8 is an exemplary display screen illustrating searching and reporting functions;

FIG. 9 is an exemplary display screen illustrating another graphical user interface;

FIGS. 12A-12E are exemplary display screens illustrating operation of a malware detection and analysis system.

DETAILED DESCRIPTION

Figure 1A:
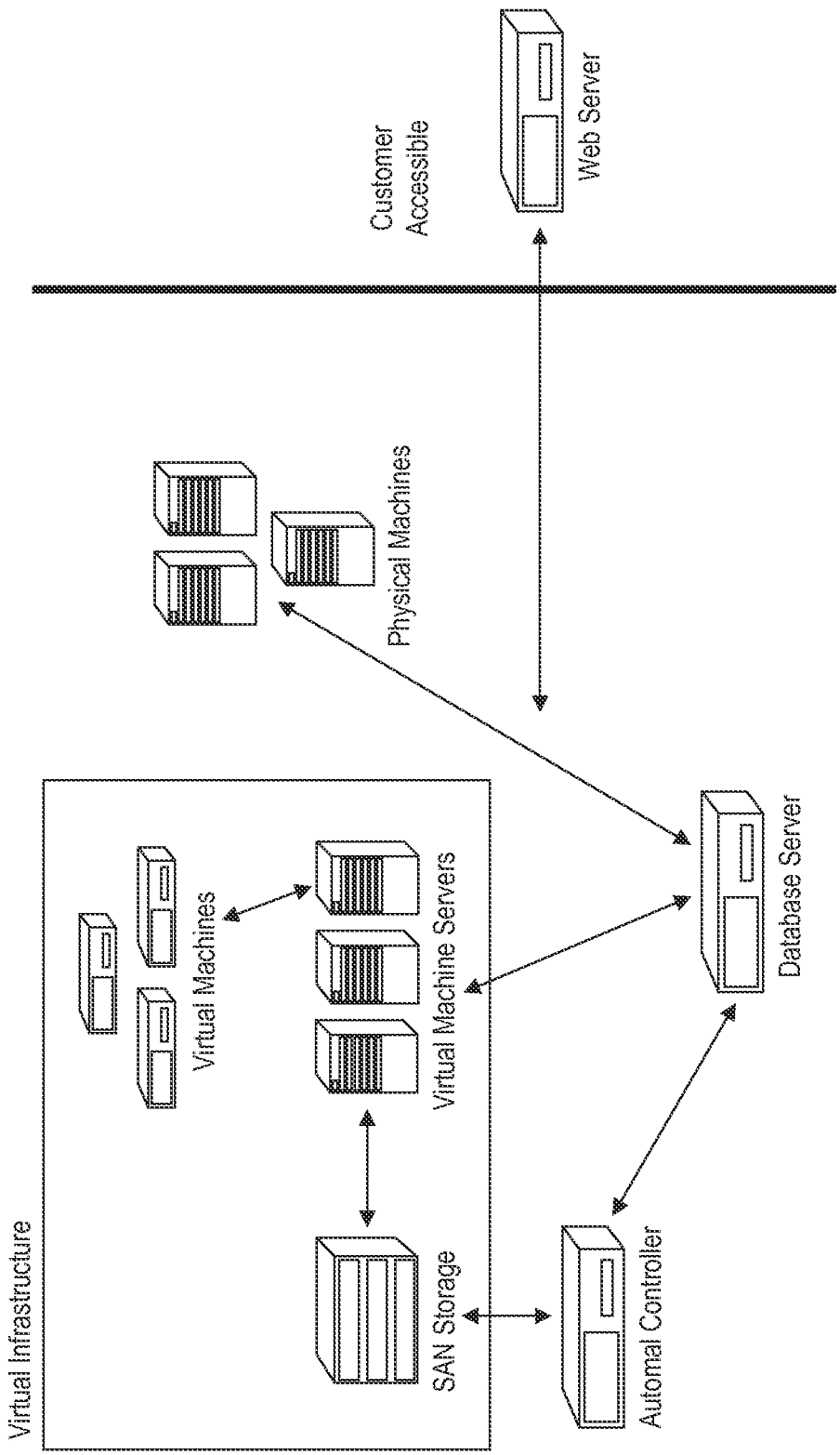
FIG. 1A is an exemplary simplified schematic diagram of a malware detection and analysis system.

Embodiments of the present application provide automated malware analysis services to customers and internal research teams. The method, system, and computer-readable medium described herein rapidly produces reports that information customers may use to analyze threats and mitigate risks. As described more fully throughout the present specification, embodiments of the present application provide an automated system (with many other integrated components to be described herein) that uses forensic tools in a post-mortem manner to analyze the behavior of malicious code and/or detect malware. Such a system can be referred to as a sandbox, which, as will be evident to one of skill in the art, is a system in which malicious software can be executed in an environment designed to eliminate adverse effects on systems outside the sandbox. The product also performs a variety of dynamic and static analysis techniques to determine exactly what the malware does while running and its full range of capabilities.

Embodiments of the present application provide benefits not available using conventional techniques. As an example, the target environment (i.e., operating system on which the malicious code executes) is not altered in any way before the malware's execution. Conventional systems install kernel drivers, service programs, and alter system files in order to monitor how the malware behaves. In effect, these conventional products force malware to execute in a heavily modified, non-native environment, which can taint the results of the analysis. A particular example includes the Application Programming Interface (API) hooks used by conventional products to log the malware's interactions with the system. The API hooks actually act as "blinders" and prevent the conventional products from determining when malware installs its own API hooks for rootkit purposes. Embodiments of the present application execute malware on a target system and then automate a forensic investigation instead of using a pre-configured set of traps for the malware.

Additionally, the embodiments described herein include the capability to determine changes made to physical memory (RAM) as a result of executing malware. Embodiments utilize one or more advanced memory forensics platforms and ancillary software including databases to compute the difference between the baseline memory dump and the "infected" memory dump. By analyzing RAM, malicious behaviors are detected that conventional approaches cannot detect (such as the API hooks mentioned above), thus providing a more comprehensive and accurate report on the malware. Moreover, embodiments of the present application have the capability to perform in-depth analysis of rootkits running in kernel mode memory (referred to as the rootkit detection component). Conventional approaches, if they report on any kernel-level activity at all, are limited to a notification that a particular driver loaded. The forensics/analysis capability described herein allow the analysis to go much deeper into the heart of the operating system (while not being disruptive since operation occurs on a memory dump once the system is frozen or powered down) to detect attempts for malware to hide in the stealthiest ways.

Furthermore, embodiments track relationships between files and malware samples (referred to as the database component). A family tree-like structure is maintained, where the initial/original sample is the parent and any dropped or downloaded files are children. The children are analyzed individually and then all information is grouped together in a big-picture scenario. This allows customers to upload a group of files (potentially from the same security incident) and have them automatically linked together in the database. Additionally, embodiments of the present application are designed to operate with an interactive website, as opposed to just generating reports in HTML and PDF form that customers can view. As described below, users can "tag" elements of a report (such as a created file name, created registry key name, loaded DLL name, or the like) as suspicious and the website will highlight those elements on the report pages for other malware samples. Users can associate text-based notes or binary attachments with a report. For example, if a malware sample encrypted a file on a victim's hard drive, the encrypted file could be associated with the malware sample in the system's database. Later, when an analyst needs to investigate the malware, the analyst may access all required files from the same location—similar to a shared, network storage system.

FIG. 1A is an exemplary simplified schematic diagram of a malware detection and analysis system according to an embodiment. The high level architecture of embodiments of the present application includes a Database server, which can be a Linux system running MySQL. Other operating systems and other database systems are included within the scope of the present invention and Linux and MySQL are merely illustrated as an example. The malware detection and analysis controller provides for control of system operations. In the illustrated embodiment, the malware detection and analysis controller is based on a Linux system that stores the main code for automating each step of the analysis. It picks up any files in the queue and sends them to the virtual infrastructure or physical infrastructure (depending on the user's preferences).

As illustrated in FIG. 1A, the virtual-machine based infrastructure includes several virtual machine servers (e.g., VMware ESXi servers—each with 10-15 virtual machines running various versions of an operating systems (e.g., Windows XP, Windows Vista, Windows 7, or the like)). The ESXi servers store the virtual disk and memory files for the virtual machines on a SAN or NAS storage device, which is accessed by the malware detection and analysis controller during the analysis phase. To provide for network access, a web server is provided, which can be a Linux system running CGI scripts written in the Python programming language. The web server accesses the Database server over the network to insert malware samples provided in various manners as described below (e.g., samples that malware detection and analysis users have uploaded through the web form) and also to retrieve results of the analysis once complete. One of ordinary skill in the art that other virtual machine implementations may be used to achieve an architecture similar to the one described herein, as well as other known means of providing a programming interface on a webserver.

Figure 1B:
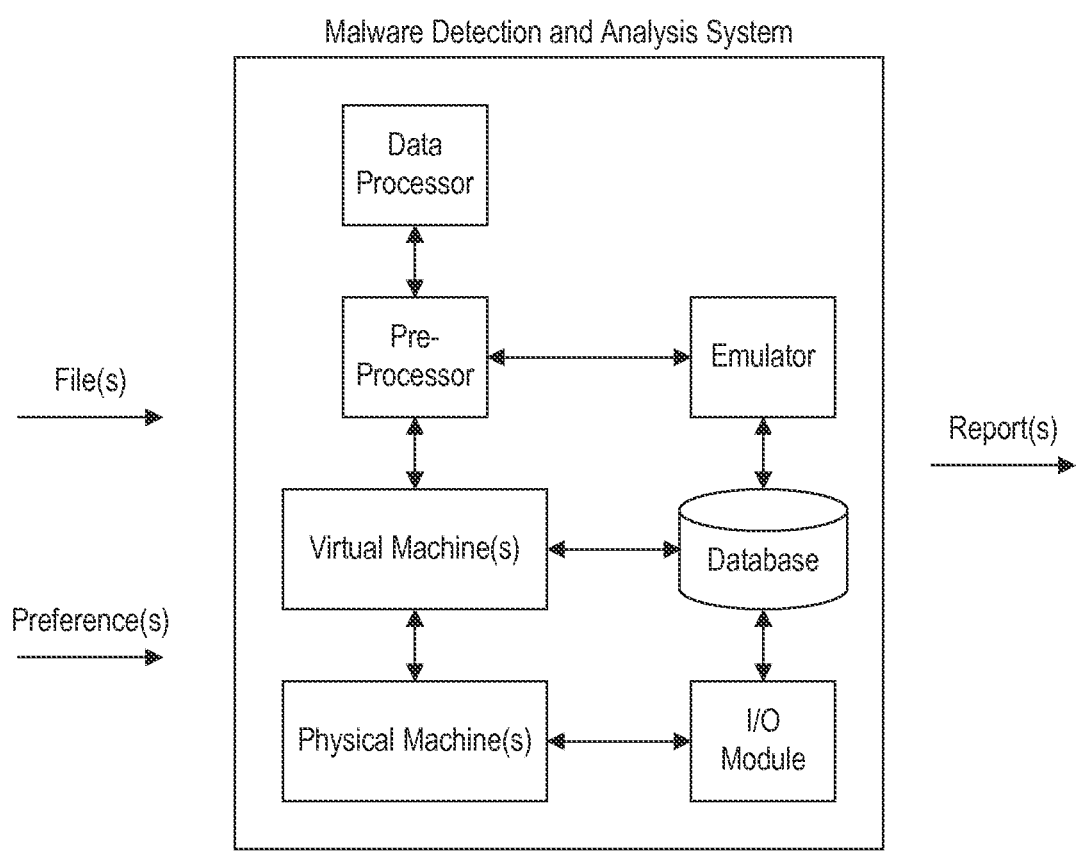
FIG. 1B is an exemplary simplified schematic diagram illustrating a malware detection and analysis system.

FIG. 1B is an exemplary simplified schematic diagram of a malware detection and analysis system according to another embodiment. As illustrated in FIG. 1B, the system receives one or more files and one or more preferences as inputs. Utilizing one or more components including a data processor, a pre-processor, virtual machine(s), physical machine(s), an emulator, a database, and/or an input/output module, the system detects malware and provides one or more reports as an output. The various components are not all required by embodiments of the present application and the system may use one or more of the illustrated components in performing the methods described herein. Further, additional components as described throughout the present specification can be utilized in place of or in conjunction with the illustrated components.

Figure 2:
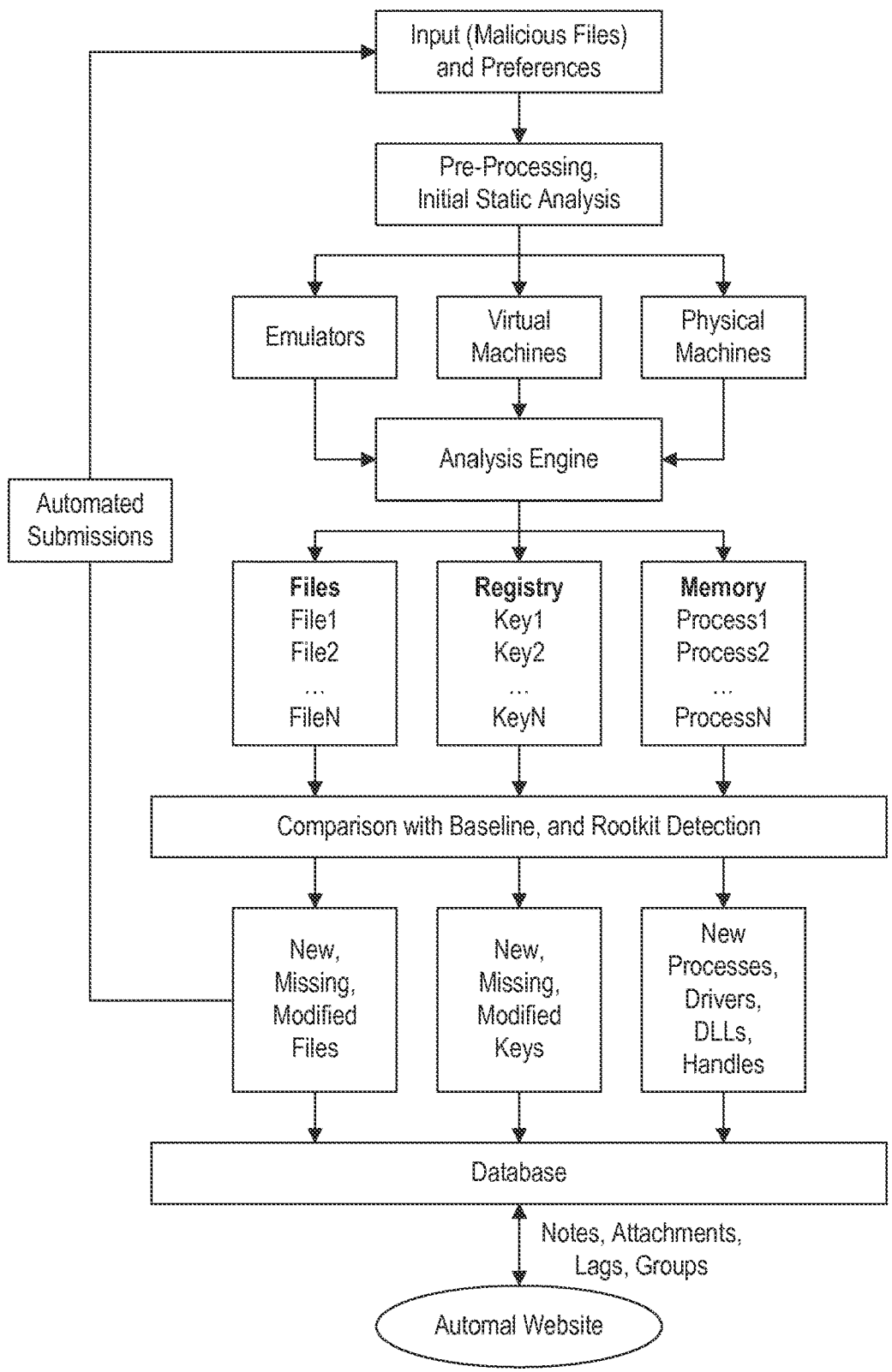
FIG. 2 is an exemplary simplified flowchart illustrating operation of a malware and analysis system.

FIG. 2 is an exemplary simplified flowchart illustrating operation of the malware and analysis system according to an embodiment. FIG. 2 provides insight into the basic workflow of the system provided by embodiments of the present disclosure. Although multiple steps and processes are illustrated in FIG. 2, not all steps and processes are required by all embodiments. The description provided in relation to FIG. 2 is merely to exemplify various operations that are possible using embodiments of the present invention and it not intended to limit the scope of the present invention. Thus, it should be appreciated that the specific steps illustrated in FIG. 2 provide a particular method of detecting and analyzing malware according to an embodiment of the present disclosure. Other sequences of steps may also be performed according to alternative embodiments. For example, alternative embodiments may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives, including, without limitation, the ability to embody the system in instructions on a computer-readable medium, which when executed perform a method comprising a malware detection and analysis system.

Referring to FIG. 2, the system receives input(s) (e.g., malicious files) and a set of user preferences. The system performs an initial static analysis on the file or files and then dispatches the file or files to a physical machine, virtual machine, or emulator for dynamic analysis. The analysis engine uses forensic tools and techniques to determine what changed on the file system, registry, and in memory. The analysis engine scans for rootkits (described in more detail below in relation to the rootkit component) and inserts the data in the database. The website allows users to browse and interact with reports.

As described in additional detail in relation to FIG. 3 below, embodiments may provide detailed, accurate reports on malware, without modifying the operating system on which it runs, by extracting information (in some implementations, a large amount of information) about the state of the system (also referred to as the "baseline") before executing the malware. The baseline includes the contents of the file system, registry, memory (RAM), and the like. After executing the malware, the system extracts a second information set (also referred to as the "comparison") while the target operating system is powered down. The powering down of the target operating system prevents the malware from "fighting back" against the information gathering process. The system then computes the difference between the baseline and the comparison.

In order to implement the methods described herein, embodiments may utilize one or more of the following components: a web site that customers can log into to submit malware samples; a group of re-usable virtual machines and physical machines on which to execute the malware samples and/or other files; and a database for storage. In a particular implementation, a set of programs written in the Python programming language are executed on the malware detection and analysis controller illustrated in FIG. 1A.

Figure 3:
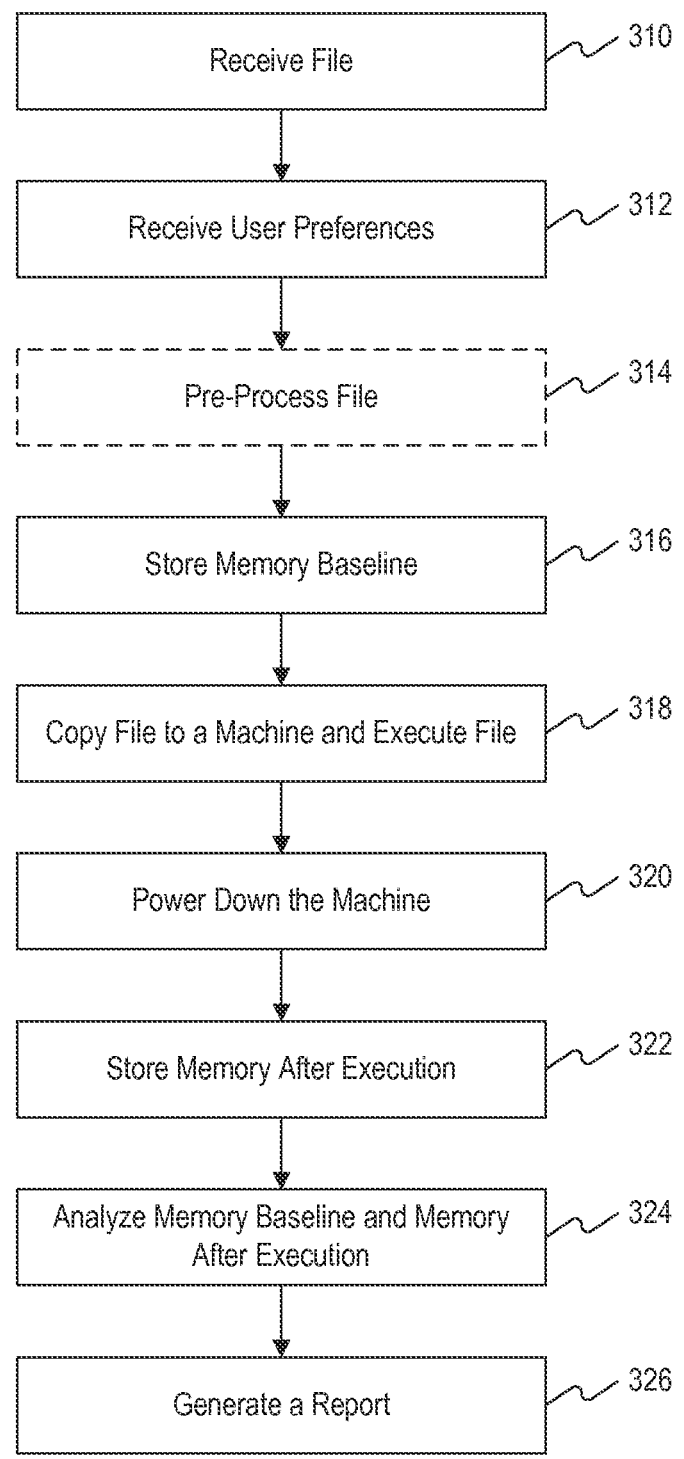
FIG. 3 is an exemplary simplified flowchart illustrating a method of detecting and analyzing malware.

FIG. 3 is an exemplary simplified flowchart illustrating a method of detecting and analyzing malware according to an embodiment. The method 300 includes receiving a file (310). The file, which may be one of several files is a potentially malicious file. The file may be any suitable file type that runs on an operating system (e.g., Microsoft Windows) and can include executables (.exe), dynamic link libraries (.dll), kernel drivers (.sys), Adobe Reader files (.pdf), Microsoft Office documents (.doc, .xls, .ppt), and URLs (typically, website addresses beginning with http://, https://, or ftp://). The file(s) may also include zip archives containing any number of the previously mentioned file types. The files can be received as a result of a customer submitting the files via one or more emails (which can include the files as attachments), uploading the one or more files to a website in communication with the system (e.g., through a web form), submitted by automated tools that are known as honeypots, which collect malware from various sites and then upload the files automatically to the system, or the like. One of ordinary skill in the art would recognize many variations, modifications, and alternatives. Thus, embodiments may utilize submissions by users, automatic submissions from honeypots or other suitable sources of malware and potential malware, and the like.

The file types include files that are executable on operating systems of interest. In an example, Windows-based operating systems are included within the scope of the present invention. In some embodiments, files that are suitable for operation on non-Windows-based operating systems are analyzed, including files that are executable on Linux-OS, Mac-OS, mobile operating systems, and the like. Thus, although the embodiments have particular applicability to Windows-based operating systems, embodiments are not limited to these particular operating systems.

User preferences are also received by the system (312). Embodiments may provide a wide variety of parameters under which the submitted file will be run during the detection and analysis phases of operation. As an example, the customer or user can choose an operating system (e.g., Windows XP, Windows Vista, Windows 7, Windows Mobile, Windows Phone, or the like), a length of time to let the file execute, what privileges to use when executing the malware (administrator or non-administrator), whether the machine should be rebooted after installing the malware but before performing an analysis (some malware only activates after the first reboot), or whether the malware should have access to real or simulated data. In some embodiments, step 312 is optional and user preferences are obtained from data related to the user or some other suitable source.

Figure 5:
FIG. 5 is an exemplary display screen of a graphical user interface.

FIG. 5 is an exemplary display screen of a graphical user interface according to an embodiment. In an embodiment, the user preferences are selected by using a web form similar to the form illustrated in FIG. 5. Referring to FIG. 5, a user is able to browse to and select a file for upload and specify a number of user preferences, which may have default values. As examples, a user may choose any argument to send to the file; an email address to which the user will receive a pdf copy of the analysis when the analysis is complete; a program to be run after the file is executed, which provides an opportunity to use additional types of analysis tools as desired by the user; the guest operating system (e.g., the malware can be run in Windows XP with Service Pack 2, Windows 7, or the like); whether the machine should reboot as sometimes malware does not activate until the first time the machine is rebooted; to run the malware as an administrative user; to run the malware as a non-administrative user (providing for an analysis of the same malware twice, once with administrative privileges and once with non-administrative privileges, thereby providing insight into what the malware does when it has administrator permissions as opposed to when it does not have these permissions); and other user preferences or parameters.

The runtime for the malware can be a useful user preference since, for some malware, the malware will not do anything malicious until a predetermined period of time after it is run for the first time, for example, five minutes or twenty minutes. In this case, when the user submits a file, the user also selects a time to let the malware run before any analysis is performed. In relation to rebooting, when a user submits malware, the user may choose to reboot the machine before performing an analysis to kind of trigger the malicious behaviors that the malware might exhibit after rebooting.

For submissions from honeypots, the program that submits the malware can also submit a set of preferences or parameters for use in the operation of the malware. The exemplary user preferences illustrated in FIG. 5 and the accompanying description are not intended to limit the scope of the present application, but merely to highlight some of the many useful parameters that can be provided in association with one or more potentially malicious files.

The method 300 also includes optional pre-processing of the submitted file(s) (314). In some implementations, the file is placed into an analysis queue with priority levels (e.g., files submitted with a high priority will be analyzed first). Pre-processing tasks can be performed such as scanning the file with antivirus signatures, determining the file type, detecting packers (i.e., methods to obfuscate the file), and computing cryptographic hashes to determine if the file is already in the database. In some implementations, the system may perform special tasks per file type using "dynamic pre-processors." As an example, if the file is an Adobe Reader (.pdf), the system will record data on the PDF tags and attempt to extract any hidden JavaScript or other embedded malicious codes. As another example, if the file is a .exe file (Windows executable), the system will perform an analysis of the PE headers and produce alerts (which will show up in the final analysis report) showing which, if any, values indicate malicious behaviors. As yet another example, if a kernel driver is uploaded, the system might perform some tasks that are specific to kernel drivers. In one implementation, a dynamic pre-processor is a Python script that performs a specific task before the primary analysis is performed. Thus, developers do not need to alter the main system source code to use pre-processors—they simply transfer a copy of a Python script in this implementation into a particular directory on the system controller's file system. Then, each time the system receives a file of the specified type, it will automatically pick up the developer's script and execute it.

The method additionally includes creating a memory baseline (316). The baseline is created as a memory dump for the computer on which the malware is to be operated before the malware is copied to and executed on the computer (e.g., a virtual machine). According to embodiments of the present application, a single baseline may be utilized in conjunction with multiple different malware samples, allowing the user to reuse the initial baseline, rather than requiring the user to create a baseline every single time a malware sample is tested. A virtual machine may be reverted to its original state (i.e., the baseline) after every piece of malware executes. In actual implementations, the system will analyze hundreds to thousands of files. In performing the file analysis, a single baseline can be utilized for one or more of the files to be analyzed.

The memory baseline includes a copy of all the files that exist on disk before running the malware, along with their complete path to the files, their cryptographic check sums, their sizes, and the like. The memory baseline may also include a copy of the registry files, which contain all the existing registry keys and all the registry values, the status of running processes, threads, and the like. The memory baseline is stored in a database (e.g., MySQL). One of ordinary skill in the art would recognize many variations, modifications, and alternatives.

The malware file is copied to a machine and executed (318), i.e., the execution system. The machine may be a clean virtual machine or a physical machine as illustrated in FIG. 1. Utilizing the parameters previously specified, the file is executed in the context of the desired operating system in order to determine the effect the file has on the system. The file runs for the desired amount of time as discussed in relation to the user choosing the execution parameters at the time of submission.

The machine is powered down (320) and the post-execution state of the memory is stored (i.e., a copy of the target system's memory (RAM) for analysis). The machine is powered down in order to access the files on the file system without rootkits and malicious code being able to intercept the ability to enumerate files. As an example, if a rootkit is installed as malware on the system, the rootkit can hide the files when they are accessed for storage. By powering the system down and analyzing the disk from a forensic perspective, the malware detection and analysis system is able to determine a list of the files that exist and their check sums and their sizes without going through the operating system running on the machine.

The memory baseline and the memory after execution are used to determine the presence of new, missing, and/or modified files. Additionally, embodiments of the present invention collect forensic artifacts from the event log, registry, application log file, and the like. The post-execution data along with the forensic artifacts are stored in a database. Utilizing the obtained artifacts, embodiments are able to generate timelines of activities performed by the malware during operation. Instead of simply reporting on what the malware changed or what it accessed (like conventional systems), embodiments can provide a report including the exact order in which the malware performed its various actions. Examples of forensic artifacts include time stamps that are associated with files, time stamps that are kept for registry keys, time stamps that are stored in the memory dump (i.e., post-execution memory), time stamps located within files on a file system (e.g., application logs or the like), etc.). Thus, time stamps are gathered from a variety of different sources. Analysis of the file system and comparison with the baseline will include an analysis of the time stamps since files with time stamps after the creation of the baseline (i.e., after the time that the file was transferred to and executed on the machine) are associated with files changed either a direct result of the malware or an indirect result of malware. One of ordinary skill in the art would recognize many variations, modifications, and alternatives.

Figure 11:
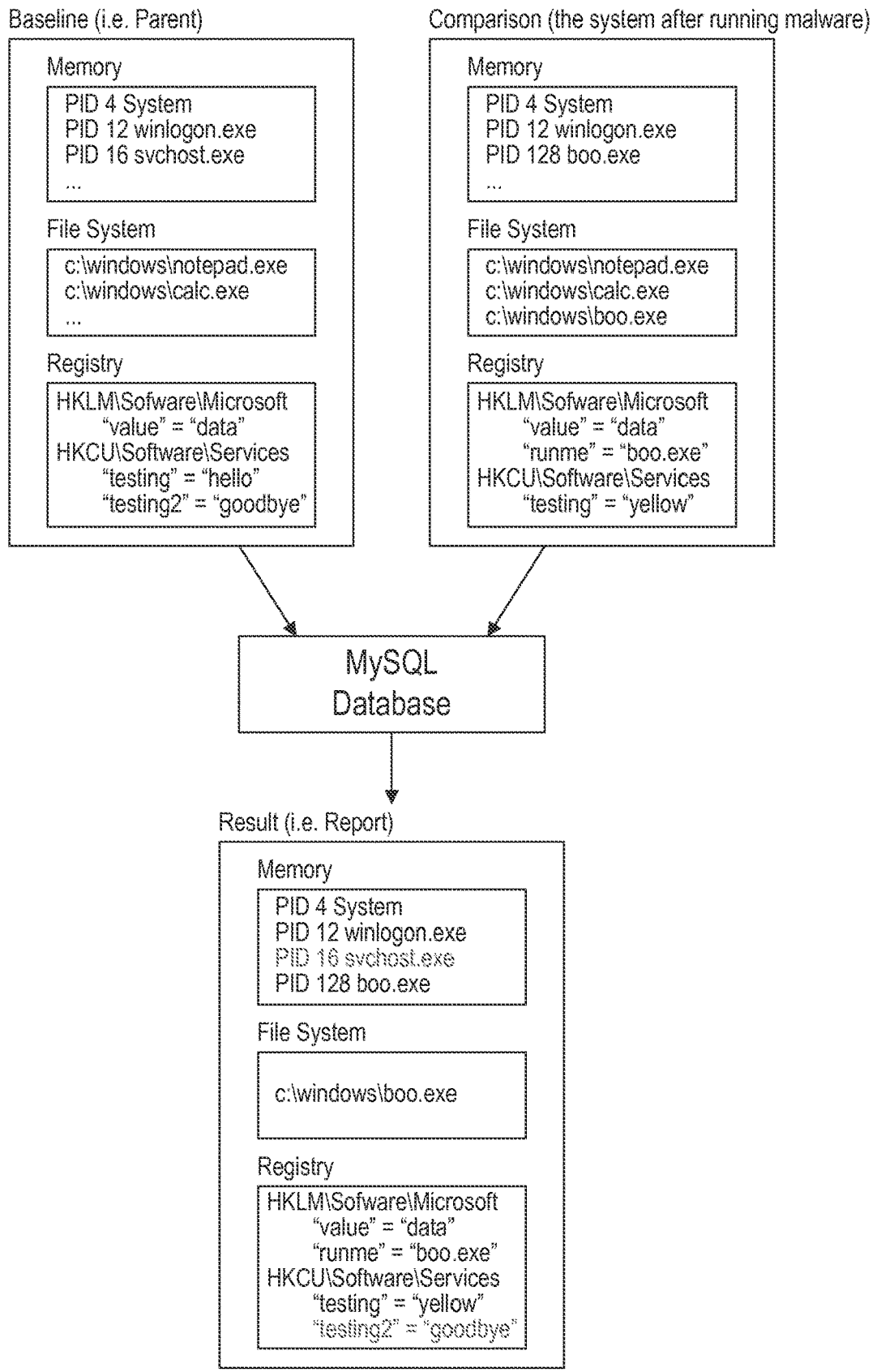
FIG. 11 is an exemplary simplified diagram illustrating a baseline, a comparison, and a report generated based on the differences between the baseline and comparisons.

FIG. 11 is an exemplary simplified diagram illustrating a baseline, a comparison, and a report generated based on the differences between the baseline and comparisons according to an embodiment. Referring to FIG. 11, an example is provided of the different data that can be stored in either the memory baseline or the post-execution memory. If there are ten processes running, the number of processes and the process names, process IDs, and the like can be stored in the memory baseline. The post-execution memory shows that a different number of processes are running, new processes, or the like. Referring to FIG. 11, process svchost.exe (PID 16) was running and is stored in the memory baseline, but is missing from the comparison (i.e., post-execution memory). A new process boo.exe (PID 128) has been initiated by the malware. Similar changes are observed for the file system, the registry, and the like. The examples illustrated in FIG. 11 are not intended to be exhaustive, but merely to highlight some of the information that may be tracked using some embodiments.

The method 300 further includes analyzing the memory baseline and the memory after execution (324) to determine the changes made by the malware and generating a report (326). The report may include a wide variety of information and can be delivered to the user in a variety of manners. As an example, the report could be provided in pdf format or the user could view the report on the website. The report can either display all of the information in the post-execution memory (e.g., all running processes) or only display the changes with respect to the memory baseline. As illustrated in FIG. 11, the report lists unchanged processes, terminated processes, and new processes, determined by comparing the baseline with the system after running malware. Data that is original, deleted, or new may be illustrated in different colors to emphasize these differences. For example unchanged processes may be displayed in a first color (e.g., gray), terminated processes (i.e., PID 16) in a second color (e.g., red), new processes (i.e., PID 128) in a third color (e.g., green), and modified data in a fourth color (e.g., orange). Other colors may, of course, be implemented or other means of distinguishing the difference in data between the baseline and the modified baseline. The baseline, comparison, and result illustrated in FIG. 11 are only provided as examples, and additional data and analysis can be provided as appropriate to the particular application. For instance, the number of network connections could be utilized in some embodiments. Thus, the memory baseline is not limited to items stored in memory, but can include other aspects of the machine's operation and state. One of ordinary skill in the art would recognize many variations, modifications, and alternatives.

The report can include a timeline associated with the changes made by the malware. As an example, using the time stamps obtained from a number of sources as discussed above, the times that files are modified and created can be combined with other time stamps related to files on the machine and other time stamps stored in memory to determine a timeline that can be displayed as part of the report. The report can be stored, delivered to the user by various means, including email, posted to one or more websites, printed, and the like.

Some embodiments distinguish between the state of a machine prior to and after execution of malware based on lists of files, registry keys, and memory objects that exist in the baseline system. After execution of the malware, one or more of the data items in the memory baseline are compared to the post-execution status of the machine. New, missing, and/or modified data in the databases is used as an illustration of this process.

Examples of information tracked, stored, and compared by some embodiments include, but are not limited to:
  Processes
  Process ID
  Parent process ID
  EPROCESS address
  Number of threads
  Number of open handles
  Full path on disk to the process executable
  Process creation time
  Process end time (if it exited)
  Ssdeep hash of the process image in memory
  Command line arguments supplied to the process
  YARA (custom antivirus signatures) hits
  Process Environment Block address
  Boolean values which are 1 (true) if the process exists in two alternate process listings or 0 (false) if the process is not in the alternate process listings
  The session in which the process is running
  If the process is in the linked list or not
  Window Stations
  Name of the window station
  EPROCESS of member processes
  Desktop Objects
  Name of the desktop's window station
  Name of the desktop
  EPROCESS of member processes
  Services
  Service Name
  Service binary path
  Process ID of the running service
  State of the service (i.e. stopped, running, paused)
  Type of service (i.e. kernel driver, DLL, exe)
  DLLs
  Base address of each DLL in a process
  Size of each DLL in a process
  Path on disk to each DLL
  Boolean values which are 1 (true) if the DLL exists in the three module lists or 0 (false) if the DLL does not exist
  Process Memory
  VAD Tag for each allocated memory segment in a process
  Starting virtual address of allocated memory region
  Ending virtual address of allocate memory region
  Page protection (i.e. read/write/execute)
  Mapped file path
  YARA (custom antivirus signatures) hits
  Contents of the memory segment if suspicious
  Kernel Drivers
  Path on disk to the kernel driver loaded
  Base address and size of the kernel driver
  SSdeep hash of the kernel driver
  Entry point of the driver
  If the driver is in the linked list or not
  Connections
  Owning process
  Local IP address
  Local Port
  Remote IP address
  Remote Port
  If the connection is linked (hidden)
  Sockets
  Owning process
  Port
  Protocol
  Creation time
  If the socket is linked (hidden)
  Handles
  Owning process
  Type of handle (i.e. file, registry key, event)
  Object name
  IDT (Interrupt Descriptor Table)
  Address of each IDT entry
  API name of the IDT handler
  SSDT (System Service Dispatch Table)
  Base address of SSDT
  Address of each entry
  Name of each entry
  Owning driver
  Notification Routines
  Type of notification routine (image load, process create, thread create)
  Address of handler
  Owning driver
  Threads
  Owning process
  Thread ID
  Starting address of the thread
  SSDT used by the thread
  Creation time of the thread
  Mutants (Mutexes)
  Owning process
  Owning thread
  Name of the mutex In addition to the operation of the system as described above, some embodiments enable the utilization of memory forensics capabilities as part of a memory forensics platform. The system described herein can be used to upload memory dumps (i.e., copies of RAM) from potentially compromised machines and the system can be used to extract critical informational, re-construct the state of the system, and produce a report on any malicious activity detected.

Additionally, some embodiments provide for a rootkit detection component that may include several scripts written in Python or another suitable scripting language. In a particular implementation, the scripts can be used to analyze data in the database for inconsistencies and other behaviors that indicate a rootkit may be present. Because embodiments perform analysis after the machine is powered down, the rootkits are prevented from concealing their presence from the rootkit detection programs. Since embodiments obtain a memory dump and analyze it rather than using the machine's operating system (e.g., Windows), rootkits are detected and reported to the user despite the rootkit's typical ability to protect itself. The memory-based rootkits and behaviors include, but are not limited to:
  Attempts to hide processes
  Attempts to hide kernel drivers
  Attempts to inject code or unlink DLLs
  Attempts to hide network sockets and connections
  Attempts to hide suspicious data in process memory Attempts to install hook in user or kernel mode memory (IAT, EAT, Inline)
Attempts to modify the IDT, SSDT, and driver IRP entries
Attempts to hide threads
Attempts to register malicious notification routines
Attempts to install promiscuous mode packet sniffers
File system-based rootkits and behaviors can include, but are not limited to:
Attempts to change timestamps on files
Attempts to disguise files by using an invalid file extension
Attempts to patch or add code to legitimate system binaries
Attempts to modify the master boot record (MBR)
Attempts to hide in unallocated/slack disk space
Attempts to hide in NTFS ADS (alternate data streams)
Attempts to disable Windows File Protection
Attempts to spread via autorun.inf files
Registry-based rootkits and behaviors can include, but are not limited to:
Attempts to disable the Windows host firewall
Attempts to start automatically with registry run keys
Attempts to overwrite or add new cryptography certificates to the system
Attempts to disable Windows File Protection (WFP)
Attempts to disable safe boot
Attempts to disable security services and antivirus products
Attempts to alter browser behaviors and plug-ins Some embodiments track relationships between files and malware samples. As an example, if a user submits a suspicious zip file, the system may open the zip file and extract the zipped files (e.g., three executable files) and automatically tag them as coming from the same zip file. Thus, the malware detection and analysis system retains information relating these three executable files to each other through the zip file although the files will be analyzed individually. Continuing with the example, the first file is analyzed in the virtual machine, the virtual machine can be reverted, the second file is analyzed in the virtual machine, the virtual machine can be reverted a second time, and the third file is analyzed in the virtual machine. The three files are linked together in the database so that at a later point in time the user can relate the files to each other. Searching on one of the files will enable the user to locate the related files that were included in the zip file.

Some embodiments may analyze malware files that operate in conjunction with each other, although independent operation may not result in malicious behavior. Additionally, multiple files can be analyzed, for example, the three files in the zip file discussed above, while the other files are existing in place. Additionally, the files can be placed in specific folders in the operating system and operation as a function of the folder location may be analyzed. For example, a piece of malware may check the directory in which it is stored. If it not located in the C:\Windows\System32 directory, the malware will not produce any result. If the malware is placed in the C:\Windows\System32 directory, then it will produce a malicious result. Thus, embodiments enable the placement of one or more files, which may be related, into folders as desired by the user.

Additionally, embodiments may track files using a tree structure. As an example, a malware sample is run, drops two other files, then contacts some site on the Internet and downloads five other files. The five new files will be detected during the method illustrated in FIG. 3 and then submitted for analysis individually. The tree structure develops as the five new files, as they are executed during analysis, can drop their own files and download other files off the Internet. Each file then is treated as a node, with the tree structure showing the relationship between parent and child files. The relationship between files can be tracked and reported out.

Embodiments may include a reverse engineering integrated development environment (IDE) based on the flexible nature of the system described herein. Thus, a reverse engineer is provided with understanding and the ability to control the flow of execution of each malware sample at a very low level. Additionally the reverse engineer is able to use the system to decode, decrypt, or unpack malware samples if the malware authors have implemented such protections.

Embodiments may support "dynamic debugger plugins," which are Python scripts that execute a malware sample under the context of a debugger. A debugger script can start and stop the malware from executing at any time, analyze the contents of the CPU registers, or change the values of variables or strings within the malware's memory in order to alter its behaviors. One example of such a plugin patches instructions in a malware sample that make it execute on systems that it otherwise would not infect. For example, some malware samples are locked to specific hardware—attackers do this to specifically prevent sandbox analysis.

Figure 4:
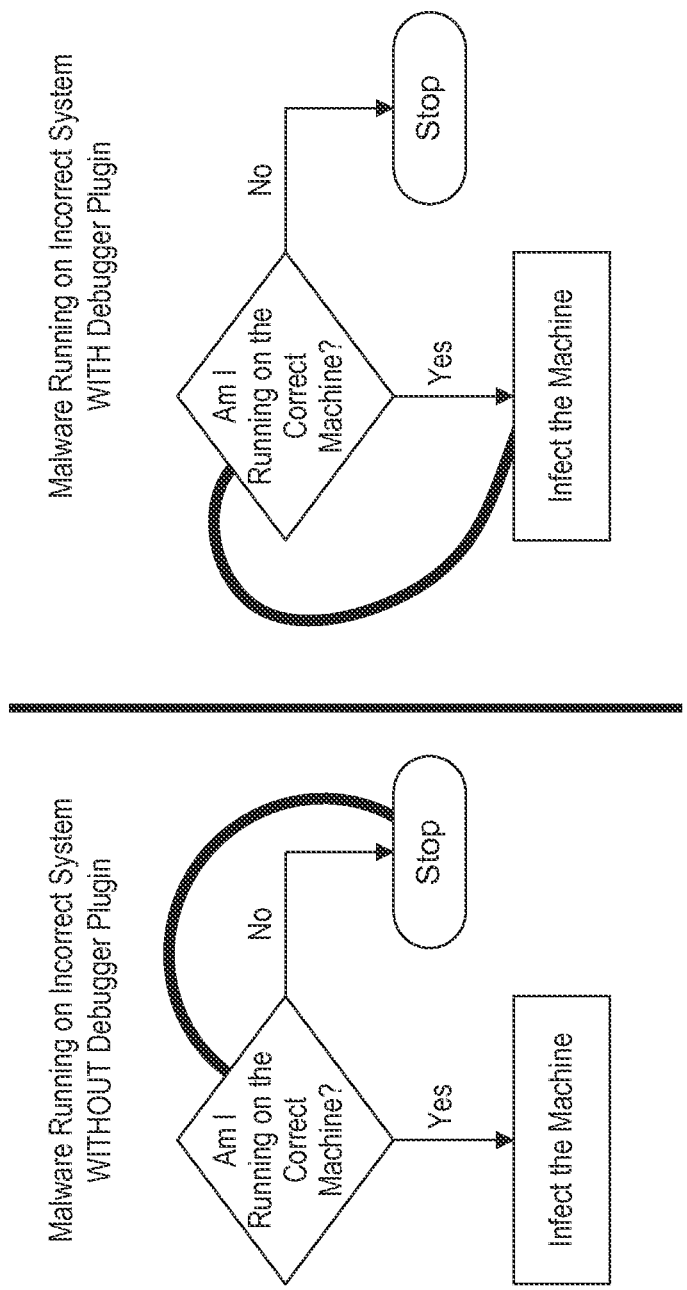
FIG. 4 is an exemplary simplified diagram illustrating operation of malware under control of a debugger.

FIG. 4 is an exemplary simplified diagram illustrating operation of malware under control of a debugger according to an embodiment. As illustrated in FIG. 4, the image on the left portion of the figure shows how malware operates on an "incorrect" system. As an example, a Trojan could be hardware locked—the Trojan uses some of the hardware of the infected machine (e.g., the serial number of the hard drive) to encrypt and store information on the hard drive particular to the infected machine. If the Trojan is then copied onto an analysis system, it will not find the needed serial number and will not perform malicious behavior. The image on the right side of the figure shows how the same malware operates on the same system, but using a debugger plugin to patch the program's logic, thereby bypassing the malware's limitation and allowing the system to execute the malware.

Additionally, embodiments may provide a reverse engineering IDE that streamlines the process of unpacking and decrypting data. As described below, embodiments provide modules that support algorithms and functions that conventional systems do not support. If a malware sample is packed, one of the pre-processors discussed in relation to step 314 of FIG. 3 can determine the type of packer used on the sample and attempt to automatically unpack it. The unpacking procedure consists of emulators, command-line programs in Linux, dumping the malware from memory, and the like. If the system is able to unpack the malware, a copy of the unpacked malware is associated with the original sample in the database.

A large number of malware samples use well-known algorithms such as base64, ROR, ROT13, and XOR to encode files and data that they store on an infected machine's disk. When the system performs the file system analysis and detects new files that may be encoded using one of the well-known algorithms, it automatically decodes the file. This instantly reveals configurations, command and control protocols, and stolen information that attackers try to hide. Users are then able to view the original (encoded) or the modified (decoded, plain text) files from the web site. Additionally, some embodiments are pre-configured with several rare algorithms implemented by specific malware families (i.e. not just well-known packing algorithms).

Embodiments may utilize a number of database component and may run MySQL. The main tables that may be included in the database include, but are not limited to:

The "submissions" table may contain one column for each of the preferences associated with a malware sample (for example, which version of Windows to execute it on, how long to let it run, and so on).

The "binaries" table may contain the malware sample itself, along with the MD5, file type, file size.

The "groups" table may associate IDs from the submissions table when multiple submissions are part of the same security incident or related in some other manner.

The "avscan" table may store the list of antivirus detections for each malware sample and any files that it drops or downloads that were detected by an antivirus product.

The "pefiles" tables may store artifacts of PE headers such as PE section names, entropy for each section, file characteristics, and imported/exported API functions.

The "network" table may store data on traffic generated by each malware sample. It includes source and destination IP address, ports, protocols, and packet payloads (the data transmitted).

The "files" table may store information on files created, modified, or deleted during an analysis. It stores timestamps of all file system related activity.

The "registry" table may store information on the registry keys or values that malware created, modified, or deleted.

The "events" table may store event log entries that were logged on the target system while the malware was running.

The "behaviors" table may contain a lengthy collection of different malicious behaviors that the malware detection and analysis system can detect. Each malware sample has a row in the behavior table, which describes its functionality set. Examples of behaviors that can be stored in this table are listed in the table's columns and a description of each is provided:

```
DROP TABLE IF EXISTS 'am_behaviors';
CREATE TABLE 'am_behaviors' (
'id' int(11)              NOT NULL,
'ads' tinyint(1)          DEFAULT 0, -- Hides in NTFS ADS streams
'mbr' tinyint(1)          DEFAULT 0, -- Modifies MBR
'rawsock' tinyint(1)      DEFAULT 0, -- Promiscuous mode NIC
'bho' tinyint(1)          DEFAULT 0, -- Installs BHO
'newsvc' tinyint(1)       DEFAULT 0, -- Creates services
'disablesec' tinyint(1)   DEFAULT 0, -- Disablesecurity/av services
'apihook' tinyint(1)      DEFAULT 0, -- Hooks API functions
'inject' tinyint(1)       DEFAULT 0, -- Injects code to other processes
'drv' tinyint(1)          DEFAULT 0, -- Loads a driver
'autostart' tinyint(1)    DEFAULT 0, -- Autostart with Windows
'disablefw' tinyint(1)    DEFAULT 0, -- Disables firewall
'listensock' tinyint(1)   DEFAULT 0, -- Opens a listening socket
'wrsysdir' tinyint(1)     DEFAULT 0, -- Writes to the SYSTEM32 directory
'dlexe' tinyint(1)        DEFAULT 0, -- Downloads an EXEIDLLISYS
'ids' tinyint(1)          DEFAULT 0, -- Trips Snort IDS alert(s)
'banker' tinyint(1)       DEFAULT 0, -- Banker / password stealer
'globaldll' tinyint(1)    DEFAULT 0, -- Maps DLL from \\?\Globalroot\
'globalnotify' tinyint(1) DEFAULT 0, -- Sets thread, proc, or image load notify routine
'wipesr' tinyint(1)       DEFAULT 0, -- Deletes system restore points
'importdna' int(11)       DEFAULT 0, -- DNA malicious index based on IAT functions
                                        (see am_alerts)
'hookirp' tinyint(1)      DEFAULT 0, -- Hooks driver IRP functions
'ssdt' tinyint(1)         DEFAULT 0, -- Modifies SSDT (hooks or makes copies)
'timestamp' tinyint(1)    DEFAULT 0, -- Sets file creation times to past dates
'misidentify' tinyint(1)  ,DEFAULT 0  -- Creates files with mis-matched extensions
'autorun' tinyint(1)      DEFAULT 0, -- Spreads through autorun
'brutepw' tinyint(1)      DEFAULT 0, -- Attempts to brute force passwords
'movefileex' tinyint(1)   DEFAULT 0, -- Deletes files with MoveFileEx
'safeboot' tinyint(1)     DEFAULT 0, -- Alters safe boot configuration
'regexec' tinyint(1)      DEFAULT 0, -- Writes values with exe, sys, dll extensions to registry
'browser' tinyint(1)      DEFAULT 0, -- Modifies browser settings
'tasks' tinyint(1)        DEFAULT 0, -- Creates scheduled tasks/jobs
'spam' tinyint(1)         DEFAULT 0, -- Sends emails including but not limited to spam
'wfp' tinyint(1)          DEFAULT 0, -- Defeats Windows file protection
'unlinkdll' tinyint(1)    DEFAULT 0, -- Unlinks DLLs
'netmod' tinyint(1)       DEFAULT 0, -- Modifies network/DNS settings
'vmdetect' tinyint(1)     DEFAULT 0, -- Detects VMs or other monitors
'encode' tinyint(1)       DEFAULT 0, -- Encodes/encrypts/compresses data
'caroot' tinyint(1)       DEFAULT 0, -- Adds new root CA certs
INDEX (id)
) ENGINE=MyISAM;
```

Embodiments may provide an environment (also referred to as a sandbox) that leverages advanced memory forensics to report on the state of a computer after the computer is infected with malware. Analysts are provided with greater control over the target environment, greater control of the type of information gathered during analysis, and the ability to go deeper into rootkit detection than by using conventional systems. Embodiments also include analysis and reporting on information such as changes to the file system, registry, and network.

Referring to FIG. 5, some embodiments provide a user interface through which a user may submit files and choose analysis preferences or parameters. In addition to files, a user can enter a URL. Multiple file types are accepted, including PDF files and multiple types of PE files: for example, EXEs, DLLs, and kernel drivers. Submissions are also accepted by using a script as well as by email attachments, links in email bodies, tweets, and the like.

FIG. 6 is an exemplary display screen of a report dashboard according to an embodiment. As illustrated in the embodiment in FIG. 6, each submitted file has its own web page that starts off with a dashboard full of useful information. From here, a user can download the Automatic Cleaner Script (.acs), find out if the malware (or any component thereof) sniffs network traffic, injects code into other processes, and things of that nature. A user can download the post-infection registry hives, a full packet capture, or the submitted file (in case the user needs to recover it).

FIG. 7 is an exemplary display screen illustrating a screen showing different anti-virus vendors' assigned names for a particular malware implementation. If the user submits the malware code to be analyzed by VirusTotal, a well-known malware scanner, the results will be displayed on this page. By clicking the virus name, the user can either show any other samples in the database with a matching name or go directly to an Internet search of the name.

Table 1 is an example of an events log analysis. This table shows any changes to the Windows event logs (System, Application, and Security) and highlights them if they appear suspicious. In this case, the malware started the "Net Login" service and terminated two others related to security (the security center and a component of the firewall). Additional columns, such as Record ID and Event ID, may be available.

Table 2 is an example of a registry analysis. The registry analysis page shows created keys/values in green, modified entries in orange and deleted entries in red. This table shows the entries that the malware created in order to start the "Net Login" service mentioned above.

TABLE 2

HKEY_LOCAL_MACHINE\SYSTEM\ControlSet001\Services\wsesvc

| | | | |
|---|---|---|---|
| Start | REG_DWORD | 0x00000002 (2) | 0x00000004 (4) |

HKEY_LOCAL_MACHINE\SYSTEM\ControlSet001\Services\SharedAccess

| | | | |
|---|---|---|---|
| Start | REG_DWORD | 0x00000002 (2) | 0x00000004 (4) |

HKEY_LOCAL_MACHINE\SYSTEM\ControlSet001\Services\NetLogin

| | | |
|---|---|---|
| Start | REG_DWORD | 0x00000002 (2) |
| Type | REG_DWORD | 0x00000010 (16) |
| DisplayName | REG_SZ | Net Login |
| ImagePath | REG_EXPAND_SZ | C:\WINDOWS\svchost.exe |
| ObjectName | REG_SZ | LocalSystem |
| ErrorControl | REG_DWORD | 0x00000001 (1) |

Table 3 is an example of a file system analysis. This table shows the files that the malware created or deleted. If the user chooses a "deep" scan on the submission page instead of a "quick" scan (which is the default in some embodiments), then it also detects changes to files based on MD5/SHA1 hash. It shows a preview of the file's contents and the file's type, so the user can easily tell if ssv.txt is really an MS-DOS executable and see that lgate.htm probably contains some encoded command and control data. Based on the content type, the user can get extended information, as shown in the next section (for example PE header details for MS-DOS programs or extracted JavaScript from malicious PDF files).

TABLE 1

| Log | Source | Type | Time | Message |
|---|---|---|---|---|
| Application | SecurityCenter | EVENTLOG_INFORMATION_TYPE | 1256158881 | |
| Application | ESENT | EVENTLOG_INFORMATION_TYPE | 1251840039 | wuaueng.dll 460 SUS20ClientDataStore: 0 |
| Application | ESENT | EVENTLOG_INFORMATION_TYPE | 1251840039 | wuauelt 460 5 01 2600 2180 |
| Application | ESENT | EVENTLOG_INFORMATION_TYPE | 1251477798 | wuaelt 1532 |
| Application | ESENT | EVENTLOG_INFORMATION_TYPE | 1251477798 | wuaueng.dll 1532 SUS20ClientDataStore: 0 |
| System | EventLog | EVENTLOG_INFORMATION_TYPE | 1256159175 | |
| System | Service Control Manager | EVENTLOG_INFORMATION_TYPE | 1256159174 | Net Login running |
| System | Service Control Manager | EVENTLOG_INFORMATION_TYPE | 1256159174 | Net Login start |
| System | Service Control Manager | EVENTLOG_INFORMATION_TYPE | 1256158882 | Security Center stopped |
| System | Service Control Manager | EVENTLOG_INFORMATION_TYPE | 1256158881 | Application Layer Gateway Service stopped |

TABLE 3

| created | C:\Documents and Settings\miles\Local Setting\Temporary Internet Files\ContentIE5\UBWDANOL\ Igate[1].htm | 152 | ASCII text, with no line terminators |
|---|---|---|---|
| 0000 | 4d 43 42 6f 64 48 52 77 4f 69 38 76 63 32 78 6c | MCBodHRw | 0i8wc2x1 |
| 0010 | 5a 58 42 68 64 47 35 70 5a 32 58 30 4c 6d 4e 75 | ZXBhdG5p | Z2h0LmNu |
| 0020 | 4c 32 4a 30 4e 79 39 6d 62 33 56 30 4c 6e 42 6f | L2J0Ny9m | B3V0LnBo |
| 0030 | 63 43 41 78 49 47 68 30 64 48 41 36 4c 79 39 7a | cCAxIGh0 | dHA6Ly9z |
| 0040 | 62 47 56 6c 63 47 46 30 62 6d 6c 6e 61 48 51 75 | bGV1cGF0 | bmlnaHQu |
| 0050 | 59 32 34 76 62 47 6c 69 4c 32 39 7a 62 59 35 30 | Y24vbGli | L29zbi50 |
| 0060 | 65 48 51 67 4d 53 42 6f 64 48 52 77 4f 69 38 76 | eHQgMSBo | dHRwOi8v |
| 0070 | 63 32 78 6c 5a 58 42 68 64 47 35 70 5a 32 58 30 | c2x1ZXBh | dG5pZ2h0 |

| created | C:\Documents and Settings\miles\Local Setting\Temporary Internet Files\ContentIE5\UBWDANOL\ssv[1].txt | 88576 | MS-DOS executable PE for MS Windows (GUI) Intel 80386 32-bit |
|---|---|---|---|
| 0000 | 4d 5a 90 00 03 00 00 00 04 00 00 00 ff ff 00 00 | MZ...... | ........ |
| 0010 | b8 00 00 00 00 00 00 00 40 00 00 00 00 00 00 00 | ........ | @....... |
| 0020 | 00 00 00 00 00 00 00 00 00 00 00 00 00 00 00 00 | ........ | ........ |
| 0030 | 00 00 00 00 00 00 00 00 00 00 00 00 80 00 00 00 | ........ | ........ |
| 0040 | 0e 1f ba 0e 00 b4 09 cd 21 b8 01 4c cd 21 54 68 | ........ | !..L.!Th |
| 0050 | 69 73 20 70 72 6f 67 72 61 6d 20 63 61 6e 6e 6f | is progr | am canno |
| 0060 | 74 20 62 65 20 72 75 6e 20 69 6e 20 44 4f 53 20 | t be run | in DOS |
| 0070 | 6d 6f 64 65 2e 0d 0d 0a 24 00 00 00 00 00 00 00 | mode.... | $....... |

Table 4 is an example of file information (for PE files). This report is available for any PE files in the database, including the submission itself, any PE files that the submission drops, any PE files extracted from network traffic, and any EXE, DLL, or SYS file extracted out of memory. The user can view the file's meta data or check over critical PE header values (highlighted values indicate packing). The second part of the page (not shown) shows imported and exported functions, any visible strings in the binary, and a hex dump.

TABLE 4

| File Meta Data | |
|---|---|
| Size | 0x15a00 |
| MD5 | 1c5e79f5f4caab5f5c9a69ab91d478b2 |
| SHA1 | 428d52728c29ec557f1e4df282ab76af70230823 |
| SSDEEP | 1536 7g+Ohs17i2uGSuoWi9VVBwwbDHjM5EeK814JvW8RPkSi/CEKCH] |

| PE Header | |
|---|---|
| ImageBase | 0x400000 |
| SizeOfImage | 0x37000 |
| NumberOfSections | 0x4 |
| AddressOfEntryPoint | 0x10f5 ( text) |
| Characteristics | 0x10f |
| TLS Directory | 1 |
| Resource Directory | 1 |
| TimeDateStamp | 0x496c1d06 ( Tue Jan 13 4:48:06 UTC 2009) |

| PE Sections | | | | |
|---|---|---|---|---|
| Section Name | VirtualAddress | VirtualSize | RawSize | Entropy |
| .rsrc | 0x17000 | 0x20000 | 0x1200 | 3.152260 |
| .rdata | 0x8000 | 0x3fa | 0x400 | 5.011950 |
| data | 0x9000 | 0xdba6 | 0xdc00 | 6.770210 |
| .text | 0x1000 | 0x62e8 | 0x6400 | 7.121550 |

Tables 5, 6, and 7 are examples of network traffic analysis. This table shows information on communications with outside hosts. It shows any tripped Snort IDS alerts, a port and protocol summary, extended details of HTTP requests, GeoIP plot-mapping (not shown), and a tool for visual breakdown of traffic into protocols, ports, and sessions.

TABLE 5

| Traffic Log (Anything Not WWW/DNS) | | | | | | |
|---|---|---|---|---|---|---|
| Protocol | Source IP | Co. | Source Port | Destination IP | Co. | Destination Port |
| TCP | 172.16.99.130 | | 1104 | 218.93.205.30 | China | 65520 |
| UDP | 172.16.99.130 | | 1112 | 239.255.255.250 | | 1900 |

TABLE 5-continued

| TCP | 172.16.99.130 | 1118 | 202.97.184.196 | China | 81 |
| UDP | 172.16.99.130 | 1112 | 239.255.255.250 | | 1900 |
| UDP | 172.16.99.130 | 1112 | 239.255.255.250 | | 1900 |
| TCP | 172.16.99.130 | 1122 | 202.97.184.196 | China | 81 |

DNS Traffic

| Query | Type | Class | Domain | Value |
|---|---|---|---|---|
| Query | A | IN | proxim.ircgalaxy.pl | |
| Query | A | IN | time.windows.com | |
| Queyr | A | IN | time.windows.com | |
| Answer | CNAME | IN | time.windows.com | time.microsoft.akadns.net |
| Answer | A | IN | time.microsoft.akadns.net | 207.46.232.182 |
| Query | A | IN | proxim.ircgalaxy.pl | |
| Answer | A | IN | proxim.ircgalaxy.pl | 218.93.205.30 |

TABLE 6

Connection To: GET sleepatnight.cn/op/Igate.php?n=46E3956E5CEA462A (91.206.201.39.80)
GET /op/Igate.php?n=46E3956E5CEA462A HTTP/1.0
Accept: */*
User-Agent: Mozilla/4.0 (compatible, MSIE 6.0, Windows NT 5.1; SV1)
Host: sleepatnight.cn
Connection: Keep-Alive

```
0000  47 45 54 20 2f 62 74 37 2f 66 6f 75 74 2e 70 68  GET /bt7/fout.ph
0010  70 20 48 54 54 50 2f 31 2e 30 0d 0a 41 63 63 65  p HTTP/1.0..Acce
0020  70 74 3a 20 2a 2f 2a 0d 0a 55 73 65 72 2d 41 67  pt: */*..User-Ag
0030  65 6e 74 3a 20 4d 6f 7a 69 6c 6c 61 2f 34 2e 30  ent: Mozilla/4.0
0040  20 28 63 6f 6d 70 61 74 69 62 6c 65 3b 20 4d 53  (compatible; MS
0050  49 45 20 36 2e 30 3b 20 57 69 6e 64 6f 77 73 20  IE 6.0; Windows
0060  4e 54 20 35 2e 31 3b 20 53 56 31 29 0d 0a 48 6f  NT 5.1; SV1)..Ho
0070  73 74 3a 20 73 6c 65 65 70 61 74 6e 69 67 68 74  st: sleepatnight
```

Response Code: 200, Content Type: data, Length: 135469 (View Details)
HTTP/1.1 200 OK
Server: nginx
Date: Wed, 21 Oct 2009 20:59:37 GMT
Content-Type: text/html
Connection: keep-alive
X-Powered-By: PHP/5.2.11
Content-Length: 152

```
0000  4d 43 42 6f 64 48 52 77 4f 69 38 76 63 32 78 6c  MCBodHRwOi8vc2xl
0010  5a 58 42 68 64 47 35 70 5a 32 68 30 4c 6d 4e 75  ZXBhdG5pZ2h0LmNu
0020  4c 32 4a 30 4e 79 39 6d 62 33 56 30 4c 6e 42 6f  L2J0Ny9mB3V0LnBo
0030  63 43 41 48 49 47 68 30 64 48 41 36 4c 79 39 7a  cCAxIGh0dHA6Ly9z
0040  62 47 56 6c 63 47 46 30 62 6d 6c 6e 61 48 51 75  bGVlcGF0bmlnaHQu
0050  59 32 34 76 62 47 6c 69 4c 32 39 7a 62 69 35 30  Y24vbGliL29zbi50
0060  65 48 51 67 4d 53 42 6f 64 48 52 77 4f 69 38 76  eHQgMSBodHRwOi8v
0070  63 32 78 6c 5a 58 42 68 64 47 35 70 5a 32 68 30  c2xlZXBhdG5pZ2h0
```

TABLE 7

| TCP/UDP/...Sessions | | | | | | |
|---|---|---|---|---|---|---|
| 1. Wed. Oct 21 16:01:04 2009 | 0 s | 172.16.99.254 -> 172.16.99.130 | ICMP | | 20 bytes | Echo raw |
| 2. Wed. Oct 21 16:01:06 2009 | 77 s | 172.16.99.130:1085 <-> 172.16.99.2:53 | domain | | 1133 bytes | raw raw as html |
| 3. Wed. Oct 21 16:01:07 2009 | 12 s | 172.16.99.130:1101 <-> 172.16.99.2:53 | domain | | 742 bytes | raw raw as html |
| 4. Wed. Oct 21 16:01:07 2009 | 97 s | 172.16.99.130:1104 -> 218.93.205.30:65520 | 65520 | | 312 bytes | raw raw |
| 5. Wed. Oct 21 16:01:16 2009 | 1 s | 172.16.99.130:1107 -> 91.206.201.39:80 | www | | 13645 bytes | raw raw as html session bytes |

Table 8 is an example of a memory forensics/analysis. Embodiments may include strong memory forensics capabilities. As described throughout the present specification, some embodiments may determine new processes, hidden or injected code, loaded kernel modules, network connections, open files, API hooks, active service processes, and the like. Embodiments also include a built-in custom memory scanner that is quick and configurable. Table 8 shows some positive hits in the memory of wuauclt.exe and winlogon.exe.

TABLE 8

| | | | | | | |
|---|---|---|---|---|---|---|
| 0x1cc (wuauclt.exe) | VadS | 0x02ad0000 | 0x02adfff | 0x6 | | 0x0 |
| 0x1cc (wuauclt.exe) | Vad | 0x7ffa0000 | 0x7ffa6fff | 0x6 | memory.460.7ffa0000-7ffa6fff.dmp | 0x0 |
| 0x69c (winlogin.exe) | Vad | 0x00400000 | 0x00431fff | 0x7 | memory.1692.400000-431fff.dmp<br>0x1d42e => IE: Password-Protected<br>0x1d860 => paypal.com<br>0x1d42e => IE: Password-Protected<br>0x1d860 => paypal.com | 0x4 |
| 0x69c (winlogin.exe) | VadS | 0x003b0000 | 0x003b0fff | 0x6 | | 0x0 |
| 0x69c (winlogin.exe) | VadS | 0x003a0000 | 0x003a4fff | 0x6 | memory.1692.3a0000-3afff.dmp<br>0x6bb => &pass | 0x1 |
| 0x69c (winlogin.exe) | VadS | 0x003c0000 | 0x003c0fff | 0x6 | | 0x0 |
| 0x69c (winlogin.exe) | VadS | 0x003d0000 | 0x003d0fff | 0x6 | | 0x0 |
| 0x69c (winlogin.exe) | VadS | 0x003e0000 | 0x003e0fff | 0x6 | | 0x0 |
| 0x69c (winlogin.exe) | VadS | 0x003f0000 | 0x003f0fff | 0x6 | | 0x0 |
| 0x69c (winlogin.exe) | VadS | 0x00d40000 | 0x00d40fff | 0x6 | | 0x0 |

Table 9 shows which API functions the malware hooked inside the explorer.exe process. It also shows the type of hook (INLINE), the relevant memory addresses, and disassembled instructions.

TABLE 9

| | | | | | | |
|---|---|---|---|---|---|---|
| 0x644 (explorer.exe) | INLINE ntdll. dll@ 0x7c900000 | NtCreatedFile | 0x7c90d682 | 0x7ffa2394 | call | 0x7ffa2394 |
| 0x644 (explorer.exe) | INLINE ntdll. dll@ 0x7c900000 | NtCreatedProcess | 0x7c90d754 | 0x7ffa23e8 | call | 0x7ffa23e8 |
| 0x644 (explorer.exe) | INLINE ntdll. dll@ 0x7c900000 | NtCreatedProcessEx | 0x7c90d769 | 0x7ffa2315 | call | 0x7ffa23f5 |
| 0x644 (explorer.exe) | INLINE ntdll. dll@ 0x7c900000 | NtOpenFile | 0x7c90dcfd | 0x7ffa23el | call | 0x7ffa23el |
| 0x644 (explorer.exe) | INLINE ntdll. dll@ 0x7c900000 | ZwCreatedFile | 0x7c90d682 | 0x7ffa2394 | call | 0x7ffa2394 |
| 0x644 (explorer.exe) | INLINE ntdll. dll@ 0x7c900000 | ZwCreatedProcess | 0x7c90d754 | 0x7ffa2e84 | call | 0x7ffa2e84 |
| 0x644 (explorer.exe) | INLINE ntdll. dll@ 0x7c900000 | ZwCreatedProcessEx | 0x7c90d769 | 0x7ffa23f5 | call | 0x7ffa23f5 |
| 0x644 (explorer.exe) | INLINE ntdll. dll@ 0x7c900000 | ZwOpenFile | 0x7c90dcfd | 0x7ffa23el | call | 0x7ffa23el |

Running Processes (Top)

| Name | Pid | EPROCESS | Threads | Handles | Created | Ended | Cmdline |
|---|---|---|---|---|---|---|---|
| System | 0x4 | 0x1bcc9c8 | 0x37 | 0x107 | | 0 | |
| smss.exe | 0x214 | 0x1ad3d38 | 0x3 | 0x15 | 1251417475 | 0 | \SystemRoot\System32\smss.exe |
| csrss.exe | 0x25c | 0x1aea020 | 0xb | 0x166 | 1251417483 | 0 | C:\WINDOWS\system32\<br>csrss.cxWindows=On SubSystemType=WServerDll=<br>winsrv:UserServerDIlInProfileControl=Off<br>MaxRequestTh |
| winlogon.exe | 0x274 | 0x1b33a48 | 0x13 | 0x226 | 1251417483 | 0 | winlogon.exe |
| services.exe | 0x2a0 | 0x1986020 | 0x11 | 0x102 | 1251417483 | 0 | C:\WINDOWS\system32\csrss |
| lsass.exe | 0x2ac | 0x1aaf020 | 0x18 | 0x14f | 1251417483 | 0 | C:\WINDOWS\system32\csrss |
| vmacthlp.exe | 0x348 | 0x1970550 | 0x2 | 0x1f | 1251417483 | 0 | "C&P:\Program Files\VMware\VMwa |
| svchost.exe | 0x354 | 0x19726e8 | 0x13 | 0xc9 | 1251417484 | 0 | C:\WINDOWS\system32\svchost |
| svchost.exe | 0x3a4 | 0x1974da0 | 0xc | 0xe2 | 1251417484 | 0 | C:\WINDOWS\system32\svchost |
| svchost.exe | 0x400 | 0x1ae458 | 0x37 | 0x409 | 1251417484 | 0 | C:\WINDOWS\system32\svchost |
| svchost.exe | 0x42c | 0x1abbda0 | 0x7 | 0x59 | 1251417484 | 0 | C:\WINDOWS\system32\svchost |
| svchost.exe | 0x458 | 0x1a9ada0 | 0x11 | 0xd7 | 1251417484 | 0 | C:\WINDOWS\system32\svchost |
| spoolsv.exe | 0x5c8 | 0x1af7da0 | 0xb | 0x79 | 1251417485 | 0 | C:\WINDOWS\system32\spoolsv |
| explorer.exe | 0x644 | 0x1770a98 | 0xb | 0x140 | 1251417486 | 0 | C:\WINDOWS\Explorer.EXE |
| WMwareTray.exe | 0x684 | 0x1b24878 | 0x2 | 0x23 | 1251417486 | 0 | "C&P:\Program Files\VMware\VMwa |
| VMwareUser.exe | 0x68c | 0x1a62020 | 0x5 | 0x4c | 1251417486 | 0 | "C&P:\Program Files\VMware\VMwa |
| VMwareService.e | 0x77c | 0x164ab28 | 0x5 | 0xaa | 1251417494 | 0 | "C&P:\Program Files\VMware\VMwa |
| wuauclt.exe | 0x1cc | 0x1aa8da0 | 0x8 | 0xb7 | 1251840039 | 0 | C:\WINDOWS\system32\wuauc1\|<br>[400] SUSDS8e4afe12626a5f40b1 |
| winlogin.exe | 0x69c | 0x1aaa228 | 0x2 | 0x27 | 1256158873 | 0 | C:\WINDOWS\system32\winlogo. |
| VRT1.tmp | 0x70 | 0x16383a0 | 0x0 | 0xffffffff | 1256158876 | . . . 891 | |
| svchost.exe | 0x7cc | 0x16ac5c8 | 0x8 | 0x7a | 1256158878 | 0 | svchost.exe C&P:\WINDOWS\TEMP |
| 4.tmp | 0x540 | 0x1afbc70 | 0x0 | 0xffffffff | 1256158880 | . . . 881 | |
| 9129837.exe | 0x600 | 0x16a2da0 | 0xb | 0x9f | 1256158881 | 0 | "C:\WINDOWS\9129837.exe" |
| cmd.exe | 0x1a0 | 0x1631020 | 0x0 | 0xffffffff | 1256158881 | . . . 882 | |
| 5.tmp | 0x694 | 0x1766da0 | 0x0 | 0xffffffff | 1256158881 | . . . 895 | |
| isvchost.exe | 0x380 | 0x1afdda0 | 0x5 | 0x87 | 1256158895 | 0 | "C:\WINDOWS\isvchost.exe" |

FIG. 8 is an exemplary display screen illustrating searching and reporting functions according to an embodiment. As illustrated in FIG. 8, the user can search for malware by hash, a/v name, a file it created, a host it contacted, an API function that it imports or exports, and a number of other data types. The user can group multiple pieces of malware into a single incident (for example, if a user finds 4 EXEs and 1 DLL on a single system, the user can upload them all and then group them together) and can bookmark reports if the user is too busy, and then go back and review them later.

Some of the existing reports included as part of the searching and reporting function (not shown in FIG. 8) include, but are not limited to:
- Most recent submissions
- Most commonly hooked API functions
- Most recently API-hooking malware
- Most recent dropped files (from any report)
- Most recently accessed URLs (from any report)
- Most TCP/UDP-traffic producing malware
- Recent malware with low/no anti-virus detection
- Most common packers
- Most common malware families
- Most common imported API functions Embodiments provide methods and systems to automate malware detection and analysis. Embodiments compliment existing infrastructure and provide an entirely new set of characteristics. Therefore, products offered by the present assignee are provided with a greater capacity for dynamically analyzing malware under a broader range of conditions. For example, some of the new options described herein include the ability to run malicious code with different privilege levels or on systems with different service packs installed.

Embodiments provide systems (also referred to as a malware sandbox) based largely or entirely on forensic data acquisition. Conventional sandboxes detect changes to the system by intercepting (or hooking) Win32 and/or kernel-level API calls. Unfortunately, in order to provide comprehensive monitoring, this conventional method creates a tainted analysis station with several hundred (or more) hooks in the operating system. Not only is it very simple to detect hooks, but it is possible for malware to install separate hooks which disable the original hooks and render the analysis system completely ineffective.

Some embodiments, on the other hand, detect changes to the system by forensically analyzing the contents of physical memory (RAM) after running the malicious binary. Embodiments can detect changes to the system in astonishing new ways, without running special monitoring tools on the analysis station that could potentially cause interference. Additionally, the systems described herein shut down the analysis system and mount the hard drive read-only in order to extract dropped files. This enables the recovery of critical data which is normally not accessible on live systems infected with Trojans such as Tigger, which hooks NTFS and FAT file system drivers.

Embodiments may provide a web front-end for malware submissions. In an embodiment, the web form generates a queue file for each submission, which contains the user-selected options. A daemon process watches for the creation of new queue files, and picks them up immediately for processing. The framework may utilize VMware's VIX API in an embodiment, which lets a processing script on the VM host control various operations of the VM guests. For example, the processing script using the VIX API can transfer submitted files to a VM guest and then execute it in the VM guest.

FIG. 9 is an exemplary display screen illustrating another graphical user interface according to an embodiment. Referring to FIG. 9, the web front-end and configuration options are illustrated for one embodiment. Choose a file to upload: This option specifies the path on a user's hard disk to the file to upload/submit. Sleep time: This option specifies the amount of time (in seconds) that the submitted file should run before the malware detection and analysis system begins analyzing the system for changes. If the default of twenty seconds is not long enough for the malware to complete execution, it is possible to re-queue the file for a longer period. Reboot before analysis: This option specifies if the infected system should reboot before the malware detection and analysis system begins analyzing the system for changes. In several cases, the payload of a Trojan might not activate until the first reboot. For example, a Trojan dropper might enter itself into the registry to automatically start with Windows and then terminate. Additionally, payloads such as the kernel driver dropped by the Torpig MBR rootkit do not take effect until the first reboot. This option to reboot ensures greater flexibility to deal with different scenarios. Post-execution program: This option specifies the path to a program on the analysis station that should execute after the malware, but before the malware detection and analysis system analyzes the system for changes. This option is similar to the reboot option; however it aims to satisfy the payloads that only activate on start-up of particular programs, such as Internet Explorer. For example, a malicious Browser Helper Object (BHO) would not activate immediately after a Trojan drops it, nor on first reboot of the system. The BHO would only activate when a new instance of Windows Explorer or Internet Explorer started up. Notify email: This option specifies the email address to which the malware detection and analysis system will send a notification upon completing the analysis. Guest OS: This option specifies the guest operating system in which to run the suspect binary. The options include XP service pack 2, XP service pack 3, Vista, and other suitable operating systems. This feature allows the user to determine exactly which operating systems (and patch levels) are affected by a particular malware or exploit. For example, it is possible to submit a binary to both XPSP2 and XPSP3 and figure out which functionality of the malware succeeds and fails on one or both of the platforms. This information is useful to administrators who need to quickly pinpoint which configurations in their environment are vulnerable. Run as administrator: This option specifies the privilege level at which the malicious code should execute. Users routinely want information regarding which privilege levels are necessary for malware features to properly execute. Similar to the information provided by the "Guest OS" feature, the information provided by the "Run as administrator" feature provides researchers with the necessary knowledge to protect their corporate networks. Monitor API: This option enables user-mode API monitoring of the suspect binary. This option provides a detailed trace of API usage at the expense of eliminating the forensic soundness of the analysis station. By enabling the API monitor, the malware detection and analysis system injects DLLs into the suspect binary as it executes. Capture screen: This option specifies if the malware detection and analysis system should capture screen shots of the analysis system's desktop during execution of the malware. If the malware produces visible windows by spawning other processes or creating a window of its own, this option allows researchers to view those windows. Comment: This option is simply to help users track their submissions. For example, if a user submits the same file multiple times (to run as admin, non-admin, and with or without API monitoring), they might want to leave a note to distinguish between the analysis results. Other embodiments provide more, fewer, or different options and preferences. One of ordinary skill in the art would recognize many variations, modifications, and alternatives.

By analyzing the contents of physical memory, embodiments can quickly determine changes to the system that resulted from running the malicious file. The list of capabilities includes, without limitation:

New running processes: Embodiments detect new processes without relying on Win32 API (or kernel API) functions to enumerate the list. Therefore, providing defense against rootkits that intentionally try to hide running processes. By identifying EPROCESS structures in memory, the malware detection and analysis system can detect even the stealthiest rootkits that hide using DKOM (direct kernel object manipulation). Since EPROCESS structures persist in memory even after the process exists, it is also possible to determine processes which ran, but then terminated before analysis.

Table 10 shows the newly created process names, their respective process IDs, and the command-line parameters (if any).

TABLE 10

Processes:

+certproc32.exe 1740 "C:\WINDOWS\certproc32.exe" [ ]
+cmd.exe 1852 "C:\WINDOWS\system32\CMD.EXE"/C del C:\297681~1.EXE>> NUL [ ]

New DLLs: Embodiments may detect new DLLs in processes. For example, if a Trojan drops a DLL to disk and then registers a message hook on the system using SefWindowsHookEx, the Trojan can force other processes to load the malicious DLL. Embodiments can identify any newly allocated memory regions in processes after running the malware. This streamlines the procedure of identifying injected code, regardless if it implements sophisticated hiding techniques.

Table 11 shows the newly loaded DLLs and their respective base addresses, size, and path on disk. Although the VMwareTray.exe process existed both before and after running the suspicious executable, the DLLs were not loaded beforehand. The additions are the result of code that Zeus (the subject malware in this example) injected into all processes on the system. The injected code has dependencies, which explains why several new DLLs exist in VMwareTray.exe after running the suspicious executable.

TABLE 11

| + | VMwareTray.exe | 0x76bf0000 | 0xb000 | C:\WINDOWS\system32\psapi.dll |
| + | VMwareTray.exe | 0x771b0000 | 0xa6000 | C:\WINDOWS\system32\wininet.dll |
| + | VMwareTray.exe | 0x77a80000 | 0x94000 | C:\WINDOWS\system32\CRYPT32.dll |
| + | VMwareTray.exe | 0x77b20000 | 0x12000 | C:\WINDOWS\system32\MSASN1.dll |
| + | VMwareTray.exe | 0x77120000 | 0x8c000 | C:\WINDOWS\system32\OLEAUT32.dll |
| + | VMwareTray.exe | 0x77ab0000 | 0x17000 | C:\WINDOWS\system32\ws2_32.dll |
| + | VMwareTray.exe | 0x77aa0000 | 0x8000 | C:\WINDOWS\system32\WS2HELP.dll |
| + | VMwareTray.exe | 0x77ad0000 | 0x9000 | C:\WINDOWS\system32\wsock32.dll |

New connects and sockets: Embodiments of the present invention detect newly created connections (to remote hosts) and sockets (listening server ports). It is not possible for rootkits to hide these entries from the malware detection and analysis system, since the evidence comes from a raw memory dump while the infected system is not running.

Table 12 shows newly created sockets after running malware Zeus in the provided system. Out of the 4 new sockets on the system, 3 are TCP (type 6) ports 7053, 5972, and 5453. The final new socket is UDP (type 17) port 1051. All sockets are opened by svchost.exe, which indicates that Zeus successfully injected code into svchost.exe to make it open the sockets.

TABLE 12

Sockets:

| + svchost.exe | 7053 | 6 | Tue Mar 24 17:20:45 2009 |
| + svchost.exe | 5972 | 6 | Tue Mar 24 17:20:45 2009 |
| + svchost.exe | 5453 | 6 | Tue Mar 24 17:20:45 2009 |
| + svchost.exe | 1051 | 17 | Tue Mar 24 17:20:45 2009 |

New file handles: Embodiments may detect if any processes open new files because of the malware executing on the system. This is not the same as detecting newly created files. For example, if a Trojan injects code into explorer.exe and makes explorer.exe call CreateFile( ) on C:\\windows\\system32\\myfile.txt, then the malware detection and analysis output will flag the open handle to myfile.txt in explorer.exe. This works regardless if the Trojan created myfile.txt or if it previously existed.

Table 13 shows an example of the newly opened file handle output after a Zeus infection. The output clearly indicates that the copy of Zeus operating inside winlogon.exe is responsible for "locking" access to the video.dll and audio.dll configuration files, as well as the primary Zeus executable (ntos.exe) by maintaining an open file handle with no sharing.

TABLE 13

Files:

| + | winlogon.exe | \WINDOWS\system32\wsnpoem\video.dll |
| + | winlogon.exe | \_SYSTEM_64AD0625_ |
| + | winlogon.exe | \WINDOWS\system32\wsnpoem\audio.dll |
| + | winlogon.exe | \WINDOWS\system32\ntos.exe |

New registry keys: Embodiments may detect if any processes open new registry keys because of the malware executing on the system. Similar to the "new files" description above, this is not the same as newly created registry keys. If a process simply opens an existing registry key during the execution of the malware, it shows up in the malware detection and analysis system output.

New kernel modules: Embodiments may detect if the malware loads any new kernel modules during execution. Embodiments identify kernel drivers that load and then unload quickly, only leaving a thread of execution running in kernel memory. Table 14 shows newly loaded kernel modules. In particular, the new_drv.sys is loaded at 0x00f8a6200 base address and ipnat.sys is loaded at 0xf6dcc000. This malware clearly installs a rootkit, but the malware detection and analysis system easily detects it.

TABLE 14

| Modules: | | | | |
|---|---|---|---|---|
| +\??\C:\WINDOWS\new_drv.sys | 0x00f8a62000 | 0x006000 | new_dry.sys | [ ] |
| −\SystemRoot\system32\DRIVERS\ipnat.sys | 0x00f6dcc00 | 0x021000 | ipnat.sys | |

New SSDT entries: The System Service Dispatch Table (SSDT) is a table of function pointers that Windows uses to locate the corresponding kernel functions. The SSDT is the most common place in the kernel for malware to hide API hooks, thus embodiments provide the feature of determining changes in the SSDT after running a suspect binary.

Table 15 shows newly created or modified SSDT entries. In this example, the malware hooked 3 entries: NtEnumerateValueKey( ), NtQueryDirectoryFile( ), and NtQuerySystemInformation( ). Based on the legitimate purpose of these functions, it indicates that the rootkit attempts to hide registry entries, files on disk, and running processes. Fortunately, the SSDT hooks only hinder code that runs on the active system. As previously described, since embodiments acquire information from the memory dump of an inactive system, the rootkit hooks do not hinder the output.

TABLE 15

| SSDT Entries: | | |
|---|---|---|
| 0x0049 | 0x8222858a | NtEnumerateValueKey!UNKNOWN |
| 0x0091 | 0x822286b6 | NtQueryDirectoryFile!UNKNOWN |
| 0x00ad | 0x8222885c | NtQuerySystemInformation!UNKNOWN |

The malware detection and analysis system's analysis capabilities via disk access: The information described above comes from parsing the contents of volatile memory (RAM). Embodiments additionally can mount the analysis system's disk as a read-only drive after executing the malware. This allows reliable change detection and extraction capabilities, which are not always possible using just RAM forensics.

Newly created files: After mounting the analysis system's disk read-only, the malware detection and analysis system can create checksums of all the files. It can easily compute the difference between a baseline disk image to determine which files the malware added, deleted, or modified. The malware detection and analysis system can analyze each newly created file in order to determine its MD5 and SH1 hash, file size, file type, contents, and the like. If the file type is an executable, the malware detection and analysis system prints PE header information for the file. If the file type is anything besides an executable, the malware detection and analysis system produces a hexdump of the first 64 bytes of content. Regardless of the file type, the malware detection and analysis system archives all newly created items in a zip file that users can download for additional analysis.

Tables 16 and 17 show examples of the newly created files output. In Table 16, the computer system dropped a file named ntos.exe. The malware detection and analysis system prints PE header information such as the ImageBase, SizeOfImage, and details on the sections and imported functions. In Table 17, malware Zeus also dropped a binary file named audio.dll. The hexdump makes it easy to see the familiar "LLAH" signature at the beginning of the file, which is the signature of a record header for older malware Zeus configuration files.

TABLE 16

Added: C:\\WINDOWS\system32\ntos.exe
Size: 474112
MD5: d83518b59e544f8322c53c00bc442d9d
SHA1: 860b352fa4ce553d281dc15b40a728b13a857145
Type: MS-DOS executable PE for MS Window's (GUI) Intel 80386 32-bit
TimeDateStamp: 0x4889dele (Fri Jul 25 14:07:26 2008)
Characteristics: 0x10f
AddressOfEntryPoint: 0x2e4b0
ImageBase: 0x400000
SizeOfImage: 0x30000
DllCharacteristics: 0x0
NumberOfSections: 0x3
Name, VirtualAddress, Misc_VirtualSize, SizeOfRawData, Characteristics
.bss, 0x1000, 0x22000, 0, 0xe0000080L
.text, 0x23000, 0xc000, 46592, 0xe0000040L
.idata, 0x2f000, 0x1000, 512, 0xc0000040L

TABLE 17

Added: C:\\WINOOWS\system32\wsnpoem\audio.dll
Size: 114
MD5: a3bdbf7a5e20ad6c274d41ff23703c5e
SEA1: 4fe2137558012be158ef18d6af3e2703a5e5f8e3
Type: data

| 00000000 | 4c | 4c | 41 | 48 | 6a | 00 | 00 | 00 | fc | 09 | f2 | 0d | 1a | 11 | 19 | 27 | [LLaHj...........] |
| 00000010 | ec | 28 | e2 | 1d | de | fa | e1 | 28 | d6 | 2b | d2 | 45 | ce | 42 | ca | 49 | \|.(......).+.E.B.I.\| |
| 00000020 | c6 | 64 | c2 | 66 | be | e5 | bb | 4a | b7 | 71 | be | 4d | ae | 53 | f7 | 6c | \|.d.f... J.q.M.S.1\| |
| 00000030 | aa | 59 | ab | 61 | e1 | 9b | f6 | 98 | c9 | 9e | ca | d2 | c6 | d5 | bf | d7 | \|.Y.a.............\| |
| 00000040 | | | | | | | | | | | | | | | | | |

Newly created registry entries: Embodiments may analyze the raw registry hive files on disk in order to detect changes. After mounting the hard drive for analysis, the malware detection and analysis system copies the hive files and compares the contents with hive files from a baseline image. It reports any deleted entries, modified entries, and added entries. The malware detection and analysis system also creates a zip archive of the raw registry hives that users can download for later analysis. Additionally, the malware detection and analysis system also creates a zip archive of the system event logs (application, system, and security) that users can download.

Table 18 shows the output of several registry modifications. It indicates that the malware created a new service on the system of type 1 (SERVICE_KERNEL_DRIVER) with a path of C:\WINDOWS\new_drv.sys.

TABLE 18

| ADDED | $$$PROTO.HIV\Software\Microsoft\InetData [2009-03-24119:34:32Z] |
|---|---|
| NEWER | $$$PROTO.HIV\ControlSet001\Service3 [2009-03-24T19:34:31Z] |
| ADDED | $$$PROTO.HIV\ControlSet001\Services\new_drv [2009-03-24119:34:322] |
| Type (REG_DWORD) = 0x00000001 (1) | |
| Start (REG_DWORD) =0x00000003 (3) | |

TABLE 18-continued

ErrorControl (REG_DWORD) = 0x00000000 (0)
ImagePath (REG_EXPAND_SZ) = \??\C:\WINDOWS\new_dry.sy3
DisplayName (REG_SZ) = !!!!

Some embodiments are also capable of acquiring information from other sources besides RAM and the hard drive. For example, embodiments include a usermode API monitor, network traffic analysis modules, the ability to capture the screen throughout an infection, and other functions.

Usermode API monitor: The API monitor output lists various sources of useful information in studying the exact behavior of an unknown program. It records the following information, without limitation:

Process ID of the process making the API call
Thread ID of the thread making the API call
Name of the process making the call (i.e. cmd.exe)
The name of the API call and all relevant parameters and values
The result of calling GetLastError( ) after the API call Table 19 shows an example of the API monitor implemented according to an embodiment of the present invention.

TABLE 19

(0x0), WSASocketW, 0x764, af:0x2; type:0x1 .-protocol:0x0
(0x0), socket, 0x764, af:0x2; type: 0x1;protocol:0x0
(0x0), bind, 0x0, socket: 0x764
(0xb7), LoadLibraryExW, 0x71ab0000, 1pFileName;WS2_32.dll
(0x0), listen, 0x764, socket:0x0
(0x0), CreateThread, 0x778, IpStartAddress:OxSel0f0;1pParameter: 0x0;dwCreationFlags: 0x0;
(0x0), WaitForSingleObjectEx, 0x0, hHandle: 0x77c;dwMilliseconds: 0xffffffff
(0x0), inet addr, 0x100007f, name: 127.0.0.1
(0x0), WaitForSingleObjectEx, 0x102, hHandle: 0x790; dwMilliseconds: 0x0
(0x0), WaitForSingleObjectEx, 0x102, hHandle: 0x790; dwMilliseconds: 0x0
(0x0), WSASocketW, 0x75c, af:0x2;type: 0x1; protocol:0x0
(0x0), socket, 0x75c, af: 0x2; type: 0x1; protocol: 0x0
(0x0), connect, 0x0, socket: 0x75c Network traffic analysis: Embodiments capture network traffic that enters and exits the analysis system. In some implementations, the system uses a tool for visual breakdown of traffic into protocols, ports, and sessions. For example, users can drill down to any traffic destined for a particular IP address or download individual segments of a packet capture. Table 20 shows the tool's interface implemented by one embodiment.

TABLE 20

| | | | TCP/UDP/... Sessions | | | |
|---|---|---|---|---|---|---|
| 1. Tue Mar 24 12:20:42 2009 | 1 s | 0.0.0.0:68 <-> 255.255.255.255:67 | bootps | 108 bytes | raw raw1 raw2 |
| 2. Tue Mar 24 12:20:42 2009 | 0 s | 172.16.99.254 -> 172.16.99.130 | ICMP | 20 bytes | Echo raw |
| 3. Tue Mar 24 12:20:42 2009 | 0 s | 172.16.99.254 -> 172.16.99.130 | ICMP | 20 bytes | Echo raw |
| 4. Tue Mar 24 12:20:43 2009 | 0 s | 172.16.99 130:68 <-> 172.16.99.254:67 | bootps | 108 bytes | raw raw1 raw2 |
| 5. Tue Mar 24 12:20:45 2009 | 8 s | 172.16.99.130:1051 <-> 172.16.99.2:53 | domain | 150 bytes | raw raw1 raw2 as html |
| 6. Tue Mar 24 12:20:45 2009 | 0 s | 239.255.255.250:1900 <-> 172.16.99.130:1053 | 1053 | 54 bytes | raw raw1 raw2 |
| 7. Tue Mar 24 12:20:46 2009 | 6 s | 239.255.255.250:1900 <-> 172.16.99.130:1057 | 1057 | 162 bytes | raw raw1 raw2 |
| 8. Tue Mar 24 12:20:46 2009 | 16 s | 172.16.99.255:137 <-> 172.16.99.130:137 | netbros-ns | 1014 bytes | raw raw1 raw2 |

TABLE 20-continued

| | | TCP/UDP/... Sessions | | | |
|---|---|---|---|---|---|
| 9. Tue Mar 24 12:20:55 2009 | 8 s | 172.16.99.255:138 <–> 172.16.99.130:138 | netbros-dgm | 432 bytes | raw raw1 raw2 |
| 10. Tue Mar 24 12:20:59 2009 | 0 s | 172.16.99.130.1058 <–> 203.66.154.232:80 | www | 0 bytes | raw raw1 raw2 |

In addition, embodiments may use additional tools to determine if any of the traffic produced by the malware contains already known patterns.

Custom antivirus signatures: Embodiments may scan uploaded files with multiple anti-virus products. As an example, the malware detection and analysis system can implement YARA (a well-known tool to help identify and classify malware families) and a set of custom-built signatures. The malware detection and analysis system scans any newly created files in addition to any newly allocated memory segments during the forensic RAM analysis. Thus, embodiments use YARA for signature based scanning as well as string-scanning to detect new instances of terms like "bank" and "credit card" in memory after malware executes.

Table 21 shows how the malware detection and analysis system implements YARA into the analysis in an embodiment. The table shows that malware Zeus injected code into smss.exe, winlogon.exe, and services.exe (the others are not shown). In smss.exe, the injected code region starts at 0x00330000 and ends at 0x00351 fff. Based on custom signatures, YARA detected "zbot" (which is another name for malware Zeus) and "inetfwmgr" (which is a generic signature for any code that contains the CLSID for the INetFwMgr interface).

TABLE 21

```
+ smss.exe pid 376 (start:0x00330000, end:0x00351fff, flags:18)
        Yara: [zbot, inetfwmgr]
        PE file dumped to XPSP2/malfind/smss.exe.2447020.00330000-00351fff.dmp
        ('.fcv\x00\x00\x00\x00', '0x1000', '0xdb81', 35840)
        ('.crsdgt\x00', '0xf000', '0x1340', 2560)
        ('.zabcf\x00\x00', '0x11000', '0x11000', 4608)
+ winlogon.exe pid 632 (start:0x01350000, end:0x01371fff, flags:18)
        Yara: [zbot, inetfwmgr]
        PE file dumped to XPSP2/malfind/winlogon.exe.2465020.01350000-01371fff.dmp
        ('.fcv\x00\x00\x00\x00', '0x1000', '0xdb81', 35840)
        ('.crsdgt\x00', '0xf000', '0x1340', 2560)
        ('.zabcf\x00\x00', '0x11000', '0x11000', 4608)
+ services.exe pid 676 (start:0x00750000, end:0x00771fff, flags:18)
        Yara: [zbot, inetfwmgr]
        PE file dumped to XPSP2/malfind/services.exe.20a55d0.00750000-00771fff.dmp
        ('.fcv\x00\x00\x00\x00', '0x1000', '0xdb81', 35840)
        ('.crsdgt\x00', '0xf000', '0x1340', 2560)
        ('.zabcf\x00\x00', '0x11000', '0x11000', 4608)
```

Screen captures: Some embodiments are able to capture screen shots of the desktop while malware executes. In one implementation, the system captures a single snapshot if the user requests the feature when submitting a file. In other embodiments, the malware detection and analysis system is capable of taking multiple screen shots across a specified time, which then builds a time-line of thumbnail images. Malware often spawns new processes or creates its own GUI windows during execution that only last a few seconds. Thus, embodiments of the present invention provide the user with the ability to "see" the windows and visual changes in the environment.

The various functions discussed in relation to Tables 10-21 are not required by all embodiments, but are only provided by way of example. Some embodiments will implement one or more of these various functions. Some embodiments will implement all of the various functions. Therefore, the illustrated functions are not intended to limit embodiments of the present application, but are only provided by way of example to demonstrate the breadth and depth of the analysis made possible by embodiments. One of ordinary skill in the art would recognize many variations, modifications, and alternatives.

Figure 10:
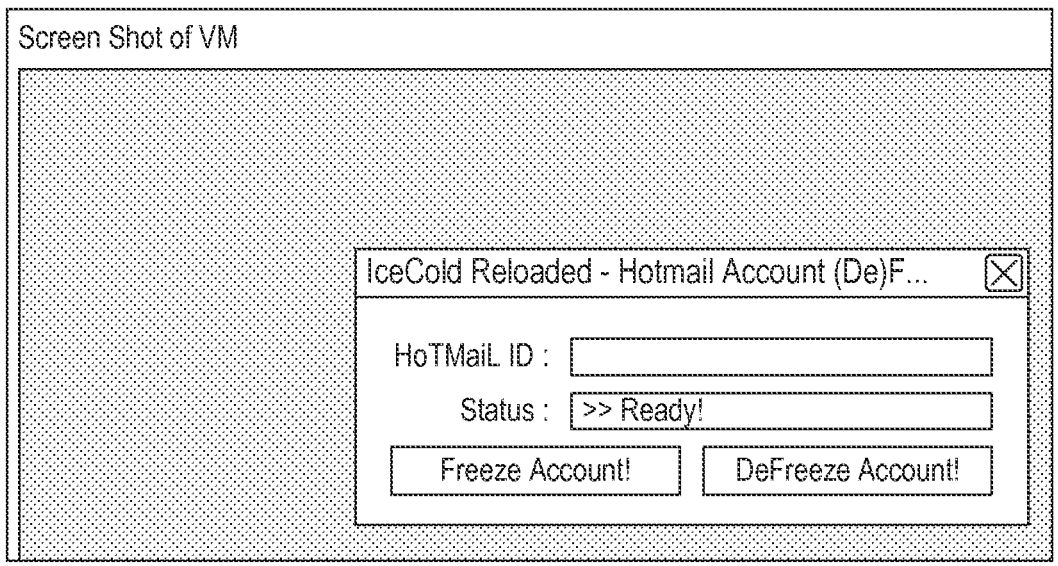
FIG. 10 is an exemplary display screen illustrating malware during operation.

FIG. 10 is an exemplary display screen illustrating malware during operation according to an embodiment. As illustrated in FIG. 10, a screen shot capability is provided by some embodiments. Thus, screen shots of the malware in action are provided. The submitted file opens an application that creates a window on screen for user input.

Figure 12C:
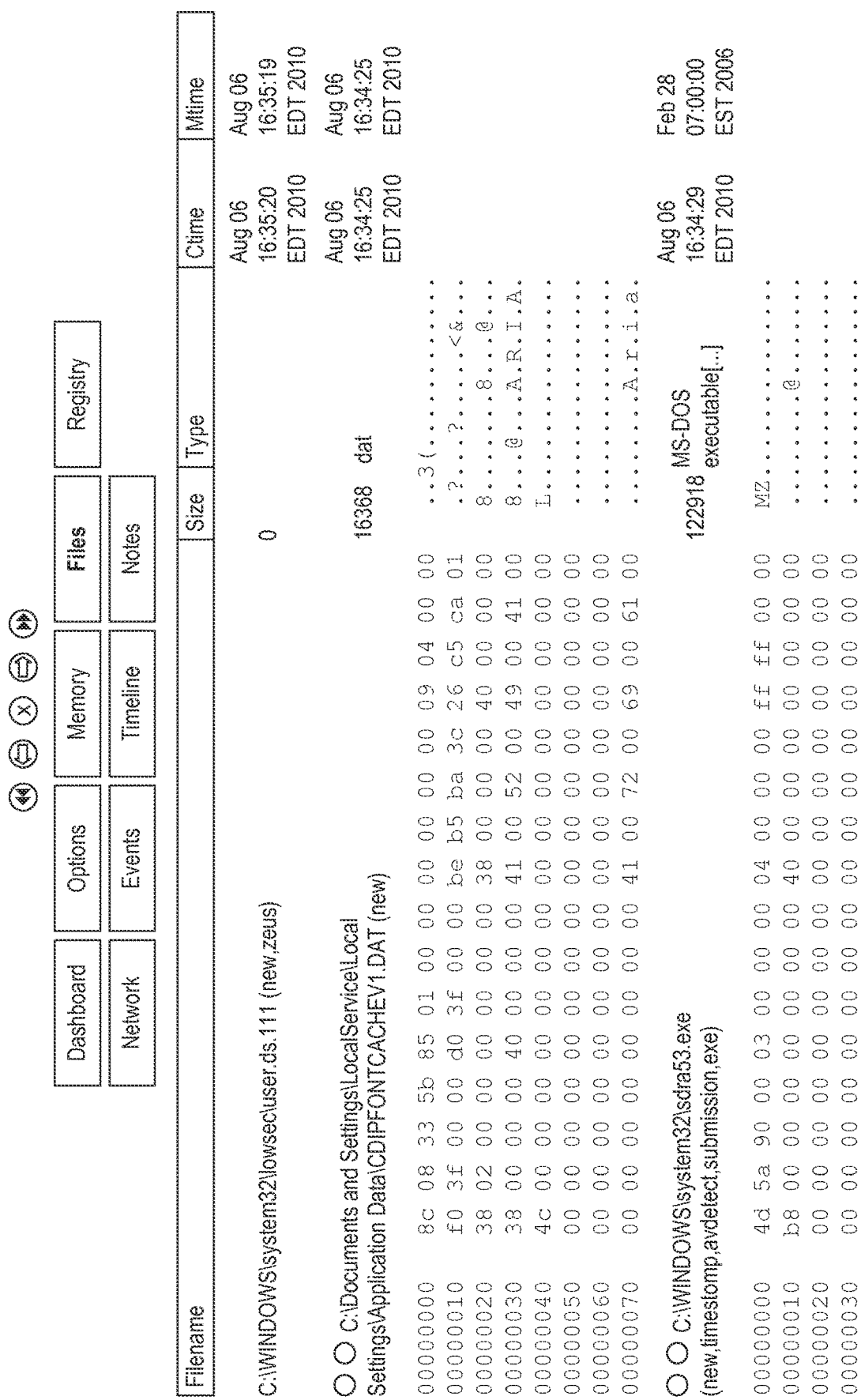

FIGS. 12A-12E are exemplary display screens illustrating operation of a system provided according to an embodiment. FIG. 12A illustrates a user interface prior to entry of a submission according to an embodiment. As discussed more fully throughout the present specification, embodiments provide multiple ways to input malicious code. One of the ways is using a command line with a Python (or other suitable) script, which can be used by automated honey pots or other automated malware collections systems. Another way is via email by composing a new message to a computer-attended email address, such as malwareAgent@company.com or other suitable address, and attaching the malicious code as an attachment to the email.

Another way illustrated in FIG. 12A is use of a graphical user interface (GUI) that can be associated with a website. When a user makes a submission through the website, the user browses to the file on the user's local file system or other suitable source. The user may also choose a URL to enter rather than uploading a file to the malware detection and analysis system. This method may be used when the user knows the address of a website that is hosting a piece of malware, however, the user does not have a copy of the malware readily available. The GUI provides a user with the ability to enter a command line argument to pass to the piece of malware that is being uploading. For example, if the malware accepts a parameter such as the port on which to listen, the malware may not listen on a port at all if the user does not supply a port (e.g., port 80). Thus, embodiments enable a user to exercise control which command line parameters are sent to the malware. The Email address box allows a user to provide an email address that can receive a report about the malware's behavior after the analysis is complete or other suitable time. The post-execution preference box allows a user to execute a program on the machine after the malware executes. In addition to text entry, embodiments provide a set of preconfigured applications that the user can run after the malware executes, shown in this embodiment in a drop down menu adjacent to the Post execution box. For example, the preconfigured applications may include, Internet Explorer, Firefox, or the like. Additionally, the user may enter the path to any program on the user's system (e.g., Windows) or programs stored remotely from the user's system.

Providing preconfigured applications like Internet Explorer and Firefox is useful since many malware samples do not exhibit particular behaviors until a browser is opened. For example, this type of malware can wait for the browser to visit a particular website and then the malware will try to steal information from that website. Thus, embodiments provide the ability to visit particular websites with browsers once the malware is installed. The guest operating system can be entered in the configuration screen, for example, XP/SP II, XP/SP III, Vista, Windows 7 other Windows-based operating systems, Macintosh operating systems, mobile operating systems, Linux-based operating systems, and the like. The Guest OS option gives the user the ability to run malware on a different platform to see how it effects those different platforms. Default runtime in the illustrated embodiment is sixty seconds for each piece of malware. Some malware may only execute their malicious behaviors after five minutes, ten minutes, other another period of downtime. Thus, the user is able to increase the runtime to a particular amount of time using the Runtime box in order to capture those behaviors that are only exhibited after a particular amount of time.

The reboot behavior gives the user the ability to reboot a machine after installing the malware. In some cases, the malware will only trigger particular behaviors after the first reboot. Thus, embodiments give the user the ability to control such behavior. The user can choose to run malware as an administrator or as a normal user. This gives the user the ability to determine how a piece of malware behaves with or without administrative privileges. The user can save a copy of the memory dump using a checkbox or other suitable input device. In some embodiments, the memory dump is saved by default for the memory analysis and the GUI enables the user to download a full copy of the memory dump after operation. The VirusTotal preference allows the user to get a list of a number of antivirus engine signatures for the malware that is uploaded. In an embodiment, a command line program is used to upload the malware sample to VirusTotal, a well-known malware scanning service, and then the system scrapes the webpage from Virus-Total and displays all the results on the malware detection and analysis system webpage.

In the illustrated embodiment, the debug plug-in is a plug-in for the Win AppDbg Debugger framework although other debugger frameworks are included within the scope of the present invention. Thus, some embodiments provide reverse engineering features as described above. As an example, a scripted debugger can be written and the malware can be analyzed within the context of the script. This gives the user the ability to remove hardware locks from malware. It also gives the user the ability to control each execution stage of the malware with very fine-grained control. Using the Comment box, the user can enter notes or other information related to the malware submission including source of the malware, testing notes, or the like.

Embodiments provide a selection of priorities for the malware sample uploaded. In the illustrated embodiment of FIGS. 12A-E, a high priority is the default for any submissions made through the web interface. Automated submissions, which are typically received around the clock in larger numbers than manual submissions, can be assigned a lower priority as appropriate to the particular application. After data entry, the user chooses Submit Query to initiate the upload of the malware sample along with the selected and/or default preferences. FIG. 12B illustrates the user interface of FIG. 12A after entry of several preferences according to an embodiment. Other preferences can be entered in other embodiments.

In an embodiment, once the malware sample has been submitted, the website will automatically redirect the user to a reports information page, which provides the main GUI for reporting on the results of the analysis for the sample that was submitted. Additionally, a GUI can be provided that provides a historical view of all samples that have been submitted to the malware detection and analysis system database. This historical view can include information including, but not limited to: a unique id for each submission; the original file name of the malware; the type of the file that was uploaded; the file status (e.g., waiting, done, defunct, or the like); priority for the malware sample; the run time; API calls monitored with respect to the sample; comments; the date that the file was submitted, or the like. In some embodiments, the historical view color codes the malware submissions a first color during processing and a second color after processing. Additionally, malware can be grouped after analysis using various colors as indicators.

A search functionality can be provided to enable the user to search for a particular malware sample that has been added in the past. The search can be based on a wide variety of search keys, some of which are listed below. Without limiting embodiments of the invention, the search can be based on:

the malware's MD5 or SHA1 hash the malware's Ssdeep hash, which is a percent similarity to other variants in the database the timeframe that the user expects a sample to have been submitted the user's comments the type of packer that was used to obfuscate a malware sample file type (e.g., .exe, .dll, .zip, .sys, svcexe, .svcdll, .pdf, .rar., .chm, .appdll, or the like)

a family name (e.g., particular strings that might exist in an antivirus vendor's name for the malware sample that was uploaded, for example Zeus, Silent Banker, Banker, or the like to find malware with these strings)

registry strings, which allows a user to search for any malware that creates, modifies, or deletes a particular registry key or value based on a substring that the user enters the file name for any created, modified, or deleted files, including any files loaded into memory rather than just files that are created on the file system the name of a service (e.g., Windows services) that the malware installs the name of a host or an IP address contacted by the malware at runtime any TCP or UDP ports that the malware either contacts a remote host on or that the malware opens on a local machine for incoming connections by other malicious systems an API function called by the malware sample that was uploaded an API function hooked by the malware (as discussed in the rootkit detection section above)

the name of a Mutex that was created by malware on the system, which is an effective way of correlating evidence across multiple malware samples. For example, one malware sample could create a particularly named Mutex. The user could then search the database for any other malware samples that created the same named Mutex.

The system can also provide a list of the behaviors that the malware detection and analysis system detects and the user can search for any samples in the database that exhibit one or more of these behaviors. Reports for the samples analyzed are provided by embodiments on a dashboard provided for each malware sample. In an embodiment, clicking on a file name of a particular malware sample takes the user to the malware sample's home page or dashboard. Information on the malware sample including submission details is provided to the user including, without limitation: the time that it was submitted, the time that the sample was copied to the virtual machine and executed and the time when the analysis was completed, the comment that the user entered during submission, if this sample was a member of any groups and the name of the group if appropriate, the user-entered email address if appropriate, and the like. An option of notifying a new recipient can also be provided.

Embodiments may provide a screen shot of a virtual machine after executing the malware. If the malware created any type of windows or opened any applications, the user would see them in the screen shot. A severity indicator (a dial, a bar, or the like) can be provided to indicate the severity (e.g., on a scale from 0 to 10) of the piece of malware based on a number of factors, including, without limitation, the number of anti-virus vendors that detected this sample as malicious and the number of behaviors that the malware detection and analysis system detected. Embodiments enable the user to download copies of the reports in one of several formats including a copy of the PDF report. The user can also download a copy of the traffic capture in TCP format for viewing in Wire Shark or any other traffic analysis tool. The user can download a zipped copy of all the files related to the malware sample, including the original file, the screen shot, the PDF report and any files created or dropped by the malware. The user can also view a report for visual breakdown of traffic into protocols, ports, and sessions as illustrated in the discussion of Table 20 above. If the malware sample contacted any hosts during the course of its execution, the user will see a breakout of the TCP, ICMP and UDP sessions. As an example, a malware sample could contact a particular host on port 80 and the user could view the exact requests that this malware sample issued to the remote hosts including binary content represented as text. In an embodiment, the actual binary content is available for download by clicking on an indicator associated with raw entries.

Embodiments may provide detailed information on the malware sample, which can be referred to as File details. The information can include information collected during the pre-processing stage discussed above. The user interface includes input devices or buttons useful in downloading the original sample (e.g., green arrow button), download an IDA database for the original sample, which allows the user to quickly reverse engineer the file, an information icon. Details include details on the executed file's PE header. In some embodiments, if the system detects any of the values displayed in the information details to be suspicious, based on a pre-populated list of heuristics, then the entries will be highlighted. For example if the file includes resource entries, a Resource Directory field can be highlighted because of the presence of the resource entries in the file. As will be evident to one of skill in the art, this indicates that the executable has other types of content wrapped up inside its own body, which sometimes means that the executable file is going to drop other files when it executes.

The user can see the TimeDateStamp, which is the compile time of this executable. The user can see all the Section Names and different attributes for them. As an example, for a malware sample, the Section Name ".reloc" can be highlighted as suspicious because its entropy value is very low (e.g., 0.8 on a scale of 0 to 8) indicating the amount of randomness of the data contained within this section. The version information can be extracted from the executable. For one malware sample, the version information includes a claim that the executable was developed by Trend Micro Incorporated and the user can see its internal name. This can be of interest to the user because it shows the user the path on disc that this program existed in before the malware authors distributed it. The malware author's user name can be displayed. Individual resource types that are compiled into the binary of the malware can be displayed. The imported functions can be displayed, which may be a low number for samples that are packed. A list of antivirus vendors that detected this malware as malicious can be displayed as well as the strings extracted from the piece of malware that was uploaded.

Embodiments of the present invention provide a behavior summary that contains a list of all the behaviors that the malware detection and analysis system detects. The behaviors are highlighted if the malware detection and analysis system detected a particular behavior after running a sample. The behaviors can be based on either the creation of a particular file, the content within the file, some heuristic behavior of the malware, some artifact found in memory after running the malware, or any number of behaviors that the system detects as a result of the malware exhibiting one or more particular behaviors.

A registry tab can be provided including color coding of the registry entries: For example, green if the entries are new; red if the entries were deleted; orange if the entries were modified; and yellow if the entries are suspicious for any reason. FIG. 12C is an exemplary display screen of a Files tab that can be provided according to an embodiment. The Files tab can use the same color coding for files as the Registries tab. In the illustrated example, the malware sample dropped a file called "user.ds.lll." The reason this entry is highlighted is because this file is a new file and because the Zeus malware is known to drop files named user.ds.lll. Embodiments may thus use signatures or rules that can indicate suspicious activity based on what has been previously determined in relation to particular piece of malware. In this example, the file size and its type are shown if the file size is not empty. In FIG. 12C, the "sdra.64.exe" file was an MS-DOS executable and the user can see the creation time and the modified time of this file on the NTSF file system. Referring to the entry for the sdra64.exe entry, it is a new file with a timestamp entry that indicates that the malware not only created this file, but once it created it, it tried to hide the fact that it was created by changing the time stamp and making the last modified date in the year 2006. The user can see that the file that was dropped (sdra.64.exe) was detected by antivirus engines and the user is provided with a hex dump preview of the contents of the file that was created. Referring to the entry in FIG. 12C, another file "local.ds" is illustrated. This is the encrypted configuration file that the Zeus malware uses to know which sites it can steal data from. A hex dump is provided, but provides limited information because it is encrypted. Embodiments enable a user to download a copy of the file straight from the website. The system will provide information related to the malware, which can be decrypted on the fly as discussed above. Embodiments provide decryption algorithms that can be used to decrypt a files such as local.ds, which is recognized as an encrypted file from the Zeus malware and decryption can be performed using an encryption key (which can be displayed to the user) and the user can be provided with a display of the plain text information associated with the file. For this local.ds example, the user can view Zeus's configuration file, which a reverse engineer or a customer who was hit by Zeus could use to determine if their institution is targeted. A search functionality can be provided for the decrypted text.

Figure 12D:
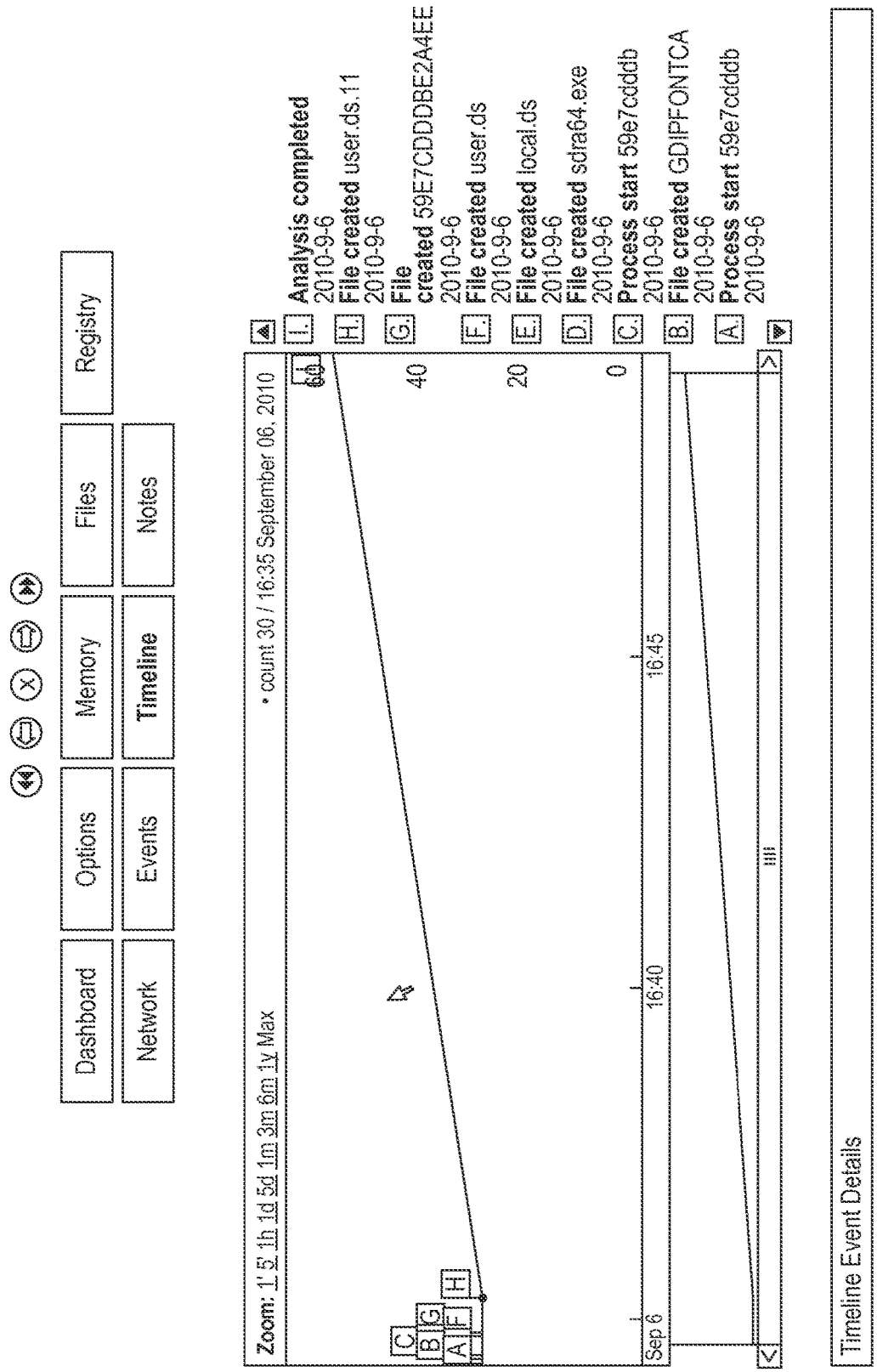

FIG. 12D is an exemplary display screen of a Timeline tab that can be provided according to an embodiment. The Timeline tab provides information on the timeline for the malware sample. The timeline is composed of artifacts extracted from the file system, the registry, the event log, memory, and the like and is combined into one timeline so that the user can easily see in which order events occurred. Referring to FIG. 12D, the user is presented with the basic timeline and can initially tell that most of the activity was contained within the first few moments of executing the malware. A zoom function is provided so that the user can use the zoom and scroll to the very beginning of the timeline to see the temporal relationship between each event that occurred.

Figure 12E:
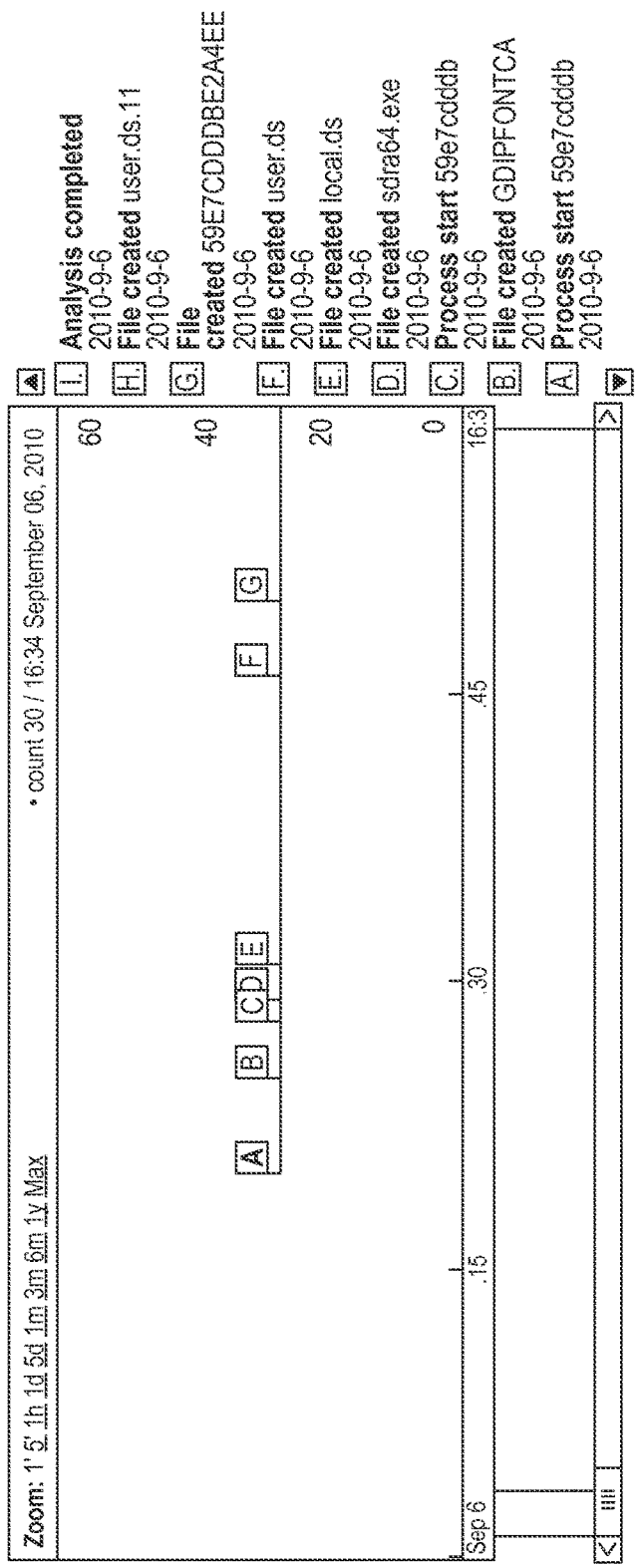

FIG. 12E is a zoomed-in portion of the display screen illustrated in FIG. 12D. The original process that was uploaded to the malware detection and analysis system was named 59e7, etc. and the process was assigned process ID 1988. That happened at point A. At point B, this particular file was created, which you can be illustrated by a full path to the file. At point C another process was started with the exact same name as the original process, but with a different process ID. This indicates that the Zeus malware created a copy of itself running in memory, most likely to evade debuggers that are trying to capture all the activity created by this process, so it spawned another copy of itself to be able to execute outside the control of a debugger. At point D, the creation of the sdra.64.exe file occurred and at point E local.ds was created. Thus, the timeline provides insight into events and their correlation, including the creation of files, events, registry entries and the like.

Embodiments may provide an Event Log tab that contains extracted entries from the application, system, and security event logs from the virtual machine on which the malware ran. The user can see the event IDs, along with the exact time that the event occurred and the message that was logged into the event log. If the user clicks a hyperlink provided by the system, the user is taken to a website that displays more information about the message that was logged. In one example, the user can see a message indicating that svchost.exe was used to create a listening port on the system, IPv4 protocol and TCP protocol. Thus, as a result of running the malware, svchost.exe started listening on a port on the system, which is evidence that the Zeus malware may open up a backdoor on the system. The system can provide, through a Network tab, a listing of host names that were resolved via DNS or that the malware executed. The user can see a hex dump of the traffic that went across the wire, the destination and source ports, the size of the payload, and the like.

In an embodiment, all of the host names with which the malware communicates are converted to longitude and latitude using geographical IP libraries and then they are converted to a static image along with the name of the city in which the destination IP existed. Thus, the user is provided with a quick view of the countries or continents that the malware contacts during its command and control sessions.

Embodiments may provide a grouping feature. This feature allows a user to upload a zip file that contains multiple specimens. Each file will be analyzed individually or in conjunction in a virtual machine and then those files will be grouped together so that later on the user can tell that all the grouped files were part of the same incident. In an embodiment, historical files that have been added and are part of a group are indicated with a green circle that stands for the parent of a group, that is, the initial file that was uploaded that later resulted in dropped or downloaded files that were analyzed individually. The user can click on a family tree button and be provided with a view of the original sample that was uploaded to the malware detection and analysis system. The unique ID assigned to the sample can be displayed The family tree can indicate that when the sample executed, it performed a variety of actions including creation of other files, creation of sockets, starting of processes, creation of registry keys, and the like. All the artifacts that occurred on the system as a result of running the malware sample can be shown by the family tree. Analysis of files that were dropped in response to the execution of the parent file is performed and similar information is provided at lower levels of the family tree in association with the dropped files.

Embodiments may provide views of family trees based on behaviors rather than artifacts, providing the user with insight into the behaviors discusses above. In the behavior view, clicking on the name of an will enable the user to view the full report for that file.

Another tab that may be provided by embodiments is the Memory tab. The Memory tab provides the user with a listing of processes that have been created, for example, in a highlighted format. New processes can be highlighted as of interest. Additionally, programs such as YARA can be used to indicate that a new process is malicious, for example, because antivirus signatures are detected in the memory of this process. Information related to the process can be provided to the user, for example, the offset within the process memory where the antivirus signature was detected, the reason why these particular strings in the process memory are of interest, and the like. An unpacked copy of the process can be downloaded or the user can click an information button to see the visible strings in the unpacked process memory.

For some malicious files, a process may be executed and then terminated before the list of processes is compared. However, embodiments of the present invention can detect the injection of code into other processes, which is how the malware stays persistent on the machine. As an example, code could be injected into svchost.exe, which is detected as suspicious strings in the memory of svchost.exe. As a result of the running the malware, svchost.exe can open a handle to a particular dll on the machine, which is not in the InLoad order, InMemory order, or InInit order module lists, indicating that these dlls have been loaded into svchost.exe but they are being hidden by a rootkit. Additionally, embodiments of the present invention provide a list of the API hooks in kernel modules that the rootkit installs. For example, NtEnumerateKey API hides registry values and NtSaveKey API and NtSaveKeyEx API prevent other programs on the system from overriding the values that the rootkit uses to stay persistent. The user can see the kernel modules that were loaded as a result of running the rootkit.

Embodiments may enable a user to see a list of the sockets that malware opens, for example, within the memory of svchost.exe, providing the user with the list of listening ports that were created as a result of running the malware. Additionally, embodiments may enable a user to view the processes that malware can hook, for example, the wuaucl-t.exe process using an IAT hook. Embodiments also can show the user EAT and inline hooks. The user can see the function name and the containing module and where code should exist for NT query directory file and the location that it's being redirected to. When the user clicks on a hooked function, the user can see a hex dump of the data that exists at that address and can see a disassembly of the instructions that execute instead of the real function. Thus, in contrast with conventional methods, embodiments of the present invention provide the user with a list of API functions are hooked, as well as a hex dump and a disassembly of the rootkit instructions.

Embodiments may provide summaries of system performance, including the most common behaviors, a list of the most common packers, the network command and control distribution in the form of a map, an antivirus word cloud, and the like.

Other embodiments of the invention will be apparent to those skilled in the art from consideration of the specification and practice of the embodiments disclosed herein, including, without limitation, the ability to embody the various embodiments in instructions on a computer-readable medium, which when executed perform a method comprising a malware detection and analysis system.. In particular, it should be appreciated that the processes defined herein are merely exemplary, and that the steps of the processes need not necessarily be performed in the order presented. It is intended that the specification and examples be considered as exemplary only, with a true scope and spirit of the embodiments being indicated by the following claims.

What is claimed is:

1. A method of detecting malicious software, the method comprising:
storing, by an analysis system, a memory baseline for a first system, the memory baseline including information stored in a memory of the first system;
executing, by the analysis system, a file on the first system using an operating system of the first system after the storing the memory baseline;
storing, by the analysis system, a post-execution memory map of the first system, the post-execution memory map including information stored in the memory of the first system after the executing the file;
analyzing, by the analysis system, the memory baseline and the post-execution memory map, wherein analyzing comprises:
determining a presence of one or more processes that changed from the memory baseline to the post-execution memory map by:
comparing one or more EPROCESS data items included in the memory baseline to one or more EPROCESS data items included in the post-execution memory map via an analysis of a first set of timestamps associated with the one or more EPROCESS data items included in the memory baseline and a second set of timestamps associated with the one or more EPROCESS data items included in the post-execution memory map, and
identifying behaviors that indicate attempts to conceal a rootkit during operation of the operating system;
determining, by the analysis system, that the file comprises malicious software based on the analyzing;
determining, by the analysis system, a timeline of activities performed by the malicious software based on a third set of timestamps associated with the one or more processes; and
reporting, by the analysis system, the malicious software including a list of the one or more processes that changed and the timeline.

2. The method of claim 1, wherein the reporting comprises transmitting a list identifying the one or more processes that changed and the timeline.

3. The method of claim 1, further comprising receiving one or more preferences related to the file, wherein the receiving the one or more preferences comprises receiving at least one of a time to run, a reboot indicator, an operating system, and a privilege level.

4. The method of claim 1, wherein the memory baseline is used for multiple analysis processes.

5. The method of claim 1, wherein determining the presence of one or more processes that changed comprises determining that the file added a new process.

6. The method of claim 1, wherein determining the presence of one or more processes that changed comprises determining that the file deleted a process.

7. The method of claim 1, wherein the file includes a signature associated with malicious software.

8. The method of claim 1 further comprising associating with the file, in a tree structure, files caused to be loaded to the first system by executing the file.

9. The method of claim 1, wherein the behaviors that indicate attempts to conceal the rootkit comprise:
attempts to hide kernel drivers;
attempts to inject code or unlink dynamic link libraries (DLLs);
attempts to hide network sockets and connections;
attempts to hide suspicious data in process memory;
attempts to install hook in user or kernel mode memory;
attempts to modify Interrupt Descriptor Table (IDT), System Service Dispatch Table (SSDT), and driver I/O request packet (IRP) entries;
attempts to hide threads;
attempts to register malicious notification routines; and
attempts to install promiscuous mode packet sniffers.

10. A system of detecting malicious software, the system comprising:
a processor; and
a storage device, wherein the storage device contains instructions that, when executed by the processor, causes the system to perform operations comprising:

storing a memory baseline for a first system, the memory baseline including information stored in a memory of the first system;

executing a file on the first system using an operating system of the first system after the storing the memory baseline;

storing a post-execution memory map of the first system, the post-execution memory map including information stored in the memory of the first system after the executing the file;

analyzing the memory baseline and the post-execution memory map, wherein analyzing comprises:

determining a presence of one or more processes that changed from the memory baseline to the post-execution memory map by:

comparing one or more EPROCESS data items included in the memory baseline to one or more EPROCESS data items included in the post-execution memory map via an analysis of a first set of timestamps associated with the one or more EPROCESS data items included in the memory baseline and a second set of timestamps associated with the one or more EPROCESS data items included in the post-execution memory map, and identifying behaviors that indicate attempts to conceal a rootkit during operation of the operating system;

determining that the file comprises malicious software based on the analyzing;

determining a timeline of activities performed by the malicious software based on a third set of timestamps associated with the one or more processes; and reporting the malicious software including a list of the one or more processes that changed and the timeline.

11. The system of claim 10, wherein the reporting comprises transmitting a list identifying the one or more processes that changed and the timeline.

12. The system of claim 10, wherein the operations further comprise receiving one or more preferences related to the file, wherein the one or more preferences include at least one of: a time to run, a reboot indicator, an operating system, and a privilege level.

13. The system of claim 10, wherein the memory baseline is used for multiple analysis processes.

14. The system of claim 10, wherein determining the presence of one or more processes that changed comprises determining that the file added a new process.

15. The system of claim 10, wherein determining the presence of one or more processes that changed comprises determining that the file deleted a process.

16. The system of claim 10, wherein the file includes a signature associated with malicious software.

17. The system of claim 10, wherein the operations further comprise associating with the file, in a tree structure, files caused to be loaded to the first system by executing the file.

18. The system of claim 10, wherein the behaviors that indicate attempts to conceal the rootkit comprise:

attempts to hide kernel drivers; attempts to inject code or unlink dynamic link libraries (DLLs);

attempts to hide network sockets and connections; attempts to hide suspicious data in process memory;

attempts to install hook in user or kernel mode memory; attempts to modify Interrupt Descriptor Table (IDT), System Service Dispatch Table (SSDT), and driver I/O request packet (IRP) entries;

attempts to hide threads;

attempts to register malicious notification routines; and attempts to install promiscuous mode packet sniffers.

19. One or more non-transitory computer-readable media storing program instructions that, when executed by one or more processing units, cause the one or more processing units to detect malicious software by performing the steps of:

storing, by an analysis system, a memory baseline for a first system, the memory baseline including information stored in a memory of the first system;

executing, by the analysis system, a file on the first system using an operating system of the first system after the storing the memory baseline;

storing, by the analysis system, a post-execution memory map of the first system, the post-execution memory map including information stored in the memory of the first system after the executing the file;

analyzing, by the analysis system, the memory baseline and the post-execution memory map, wherein analyzing comprises:

determining a presence of one or more processes that changed from the memory baseline to the post-execution memory map by:

comparing one or more EPROCESS data items included in the memory baseline to one or more EPROCESS data items included in the post-execution memory map via an analysis of a first set of timestamps associated with the one or more EPROCESS data items included in the memory baseline and a second set of timestamps associated with the one or more EPROCESS data items included in the post-execution memory map, and identifying behaviors that indicate attempts to conceal a rootkit during operation of the operating system;

determining, by the analysis system, that the file comprises malicious software based on the analyzing;

determining, by the analysis system, a timeline of activities performed by the malicious software based on a third set of timestamps associated with the one or more processes; and reporting, by the analysis system, the malicious software including a list of the one or more processes that changed and the timeline.

\* \* \* \* \*